(12) United States Patent
Duggal

(10) Patent No.: US 11,411,526 B2
(45) Date of Patent: Aug. 9, 2022

(54) INFRASTRUCTURE ENERGY GENERATION SYSTEM COMPRISING PHOTOVOLTAIC STRUCTURES

(71) Applicant: Vijay Duggal, Elmhurst, NY (US)

(72) Inventor: Vijay Duggal, Elmhurst, NY (US)

(73) Assignee: INNOTECT, New York City, NY (US)

( * ) Notice: Subject to any disclaimer, the term of this patent is extended or adjusted under 35 U.S.C. 154(b) by 0 days.

(21) Appl. No.: 17/079,067

(22) Filed: Oct. 23, 2020

(65) Prior Publication Data
US 2021/0126574 A1 Apr. 29, 2021

Related U.S. Application Data

(60) Provisional application No. 62/925,171, filed on Oct. 23, 2019.

(51) Int. Cl.
| | | |
|---|---|---|
| *H02S 20/21* | (2014.01) | |
| *H02J 3/38* | (2006.01) | |
| *H02J 7/35* | (2006.01) | |
| *B60L 53/51* | (2019.01) | |
| *E01C 1/00* | (2006.01) | |

(Continued)

(52) U.S. Cl.
CPC ............. *H02S 20/21* (2014.12); *B60L 53/51* (2019.02); *E01C 1/00* (2013.01); *H02J 3/381* (2013.01); *H02J 7/35* (2013.01); *H02S 20/20* (2014.12); *B60L 9/00* (2013.01); *E01F 15/08* (2013.01); *F21S 9/032* (2013.01); *H02J 2300/24* (2020.01)

(58) Field of Classification Search
CPC .......... H02S 20/20; H02S 20/21; H02J 3/381; H02J 7/35; H02J 3/38
See application file for complete search history.

(56) References Cited

U.S. PATENT DOCUMENTS

| | | | |
|---|---|---|---|
| 10,826,426 B1 * | 11/2020 | Tyler | H02S 40/10 |
| 2008/0137327 A1 * | 6/2008 | Hodulik | F21S 8/086 362/183 |

(Continued)

FOREIGN PATENT DOCUMENTS

| | | | | |
|---|---|---|---|---|
| CH | 706951 A2 * | 3/2014 | | H02S 20/10 |
| CN | 103856151 A * | 6/2014 | | F03D 9/007 |

(Continued)

OTHER PUBLICATIONS

Harrel et al, "Joint Spacing for Concrete Structures", Sep. 2016, U.S. Dept of the Interior, Bureau of Reclamation, Reclamation, Managing Water in the West (Year: 2016).*

(Continued)

*Primary Examiner* — Adi Amrany

(57) ABSTRACT

An infrastructure energy generation system comprising plurality of photovoltaic structures installed along a road or transportation route to generate electricity from solar energy. An electricity transmission line is installed along said road or transportation route which is connected to vehicle charging facilities, electric trains, electric buses, electric trucks, transportation facilities and roadside lights. The electricity transmission line is connected to at least one electricity generation source such as a generator or an electric battery. The infrastructure energy generation system is configured as a Distributed Energy Resource (DER), a microgrid, a grid-tied electrical system or an off-grid electrical system.

19 Claims, 26 Drawing Sheets

(51) Int. Cl.
*H02S 20/20* (2014.01)
*E01F 15/08* (2006.01)
*F21S 9/03* (2006.01)
*B60L 9/00* (2019.01)

(56) References Cited

U.S. PATENT DOCUMENTS

| | | | | |
|---|---|---|---|---|
| 2008/0149403 | A1* | 6/2008 | Fein | B60L 8/006 |
| | | | | 180/2.2 |
| 2008/0154801 | A1* | 6/2008 | Fein | H02S 20/21 |
| | | | | 705/412 |
| 2009/0195077 | A1* | 8/2009 | Blumenthal | F03G 7/08 |
| | | | | 307/72 |
| 2010/0200041 | A1* | 8/2010 | Dearborn | H02S 20/00 |
| | | | | 136/244 |
| 2010/0327657 | A1* | 12/2010 | Kuran | H02J 3/38 |
| | | | | 307/43 |
| 2011/0017256 | A1* | 1/2011 | Stevens | H02S 20/00 |
| | | | | 136/244 |
| 2011/0023867 | A1* | 2/2011 | Muchow | H02S 20/23 |
| | | | | 126/623 |
| 2011/0047931 | A1* | 3/2011 | Wallgren | H02S 20/24 |
| | | | | 52/745.19 |
| 2012/0211046 | A1* | 8/2012 | Smyth | H01L 31/042 |
| | | | | 136/244 |
| 2012/0280570 | A1* | 11/2012 | Smythe | H02S 20/00 |
| | | | | 307/69 |
| 2013/0314255 | A1* | 11/2013 | BEnn | E01F 9/688 |
| | | | | 340/908 |
| 2014/0020320 | A1* | 1/2014 | Parkes | E01C 11/14 |
| | | | | 52/396.05 |
| 2014/0246903 | A1* | 9/2014 | Romeo | H02S 20/32 |
| | | | | 307/11 |
| 2015/0077979 | A1* | 3/2015 | Namors | E01F 15/08 |
| | | | | 362/153.1 |
| 2015/0122333 | A1* | 5/2015 | Kitano | H02S 20/20 |
| | | | | 136/259 |
| 2015/0136208 | A1* | 5/2015 | Park | F24S 25/65 |
| | | | | 136/251 |
| 2015/0222226 | A1* | 8/2015 | Giles | F24S 25/50 |
| | | | | 29/525.01 |
| 2017/0040933 | A1* | 2/2017 | Vogel | H02S 40/36 |
| 2017/0093328 | A1* | 3/2017 | Wylie | H02S 30/10 |
| 2017/0202155 | A1* | 7/2017 | Iwai | E04B 7/18 |
| 2018/0254736 | A1* | 9/2018 | Duggal | H01L 31/042 |
| 2019/0386601 | A1* | 12/2019 | Keller | H02S 30/10 |

FOREIGN PATENT DOCUMENTS

| | | | | |
|---|---|---|---|---|
| CN | 106786772 | * | 5/2017 | H02J 3/38 |
| CN | 206490625 U | * | 9/2017 | |
| CN | 109873445 A | * | 6/2019 | |
| WO | WO-2010123929 A1 | * | 10/2010 | E04H 6/025 |

OTHER PUBLICATIONS

Wikipedia entry for "Jersey Barrier". Available at https://en.wikipedia.org/wiki/Jersey_barrier. Available as early as Mar. 18, 2015 (Year: 2015).*

* cited by examiner

INFRASTRUCTURE ENERGY GENERATION SYSTEM COMPRISING PHOTOVOLTAIC STRUCTURES

A portion of the disclosure of this patent document contains material which is subject to (copyright or mask work) protection. The (copyright or mask work) owner has as no objection to the facsimile reproduction by anyone of the patent document or the patent disclosure, as it appears in the Patent and Trademark Office patent file or records, but otherwise reserves all (copyright or mask work) rights whatsoever.

CROSS-REFERENCE TO RELATED APPLICATIONS

The present application claims benefit of provisional utility application 62/925,171; the entire contents of the provisional application are incorporated into the present application by reference.

TECHNICAL FIELD

The present invention relates to an infrastructure energy generation system (IEGS) comprising photovoltaic structures installed along transportation routes. The electricity produced can be used to power electric vehicles, electric vehicle charging stations and other transportation facilities along these transportation routes. The present invention discloses a number of novel photovoltaic structures (solar arrays) installed along transportation routes that generate electricity for the infrastructure energy generation system (IEGS).

BACKGROUND OF THE INVENTION

Land costs are the major expense of solar farms. Many jurisdictions have banned the use of prime land for solar farms due to shortage prime land. Another disadvantage of conventional solar farms is that they are generally located at remote locations to save on land costs. This results in significant loss of electricity due to long distant transmission of electricity. The present solves these problems by utilizing the sides of the roads and train tracks for the installation of photovoltaic structures. The electricity produced can be directly utilized by the transportation vehicles and equipment along these transportation routes. This makes economical use of land as well as minimizes transmission losses.

The present invention discloses an infrastructure energy generation system (IEGS) that generates electricity from photovoltaic structures installed along transportation routes such as roads, highways and train tracks. The electricity produced can be supplied to a microgrid, smart grid, a utility grid or to an off-grid electrical system along these transportation routes. In one embodiment of the invention an electric transmission line or a microgrid is installed along a transportation route, and the electricity produced by photovoltaic structures is supplied to this electric transmission line. In one embodiment of the present invention the electricity from this electric transmission line is used to power electric trains and electric road vehicles by using pantographs. In one embodiment of the present invention the electricity produced is used to charge electric vehicles by using plurality of electric vehicle charging stations along these transportation routes. In one embodiment of the present invention the electricity produced is used to power transportation related facilities along these routes. In one embodiment of the present invention the infrastructure energy generation system (IEGS) is connected to one or more electric batteries to enable electricity when solar power is not available. In another embodiment of the invention the infrastructure energy generation system is configured as a grid-tied system connected to a utility grid, a microgrid or a smart grid to enable electrical power when solar power is not available. In one embodiment of the invention IEGS is part of a distributed energy resources (DER) system.

DER systems typically use renewable energy sources, including small hydro, biomass, biogas, solar power, wind power, and geothermal power, and increasingly play an important role for the electric power distribution system. A grid-connected device for electricity storage can also be classified as a DER system and is often called a distributed energy storage system (DESS). By means of an interface, DER systems can be managed and coordinated within a smart grid. Distributed generation and storage enables the collection of energy from many sources and may lower environmental impacts and improve the security of supply.

One of the major issues with the integration of the DER such as solar power, wind power, etc. is the uncertain nature of such electricity resources. This uncertainty can cause a few problems in the distribution system: (i) it makes the supply-demand relationships extremely complex, and requires complicated optimization tools to balance the network, and (ii) it puts higher pressure on the transmission network, and (iii) it may cause reverse power flow from the distribution system to the transmission system.

Microgrids are modem, localized, small-scale grids, contrary to the traditional, centralized electricity grid (macrogrid). Microgrids can disconnect from the centralized grid and operate autonomously, strengthen grid resilience, and help mitigate grid disturbances. They are typically low-voltage AC grids, often use diesel generators, and are installed by the community they serve. Microgrids increasingly employ a mixture of different distributed energy resources, such as solar hybrid power systems, which significantly reduce the amount of carbon emissions. —Wikipedia.org When excessive solar power is available the electricity produced by solar arrays is transmitted to the utility grid, microgrid or smart grid; when solar power is not available the electricity is utilized from the utility grid, microgrid, or smart grid.

DESCRIPTION OF RELATED ART

Refer to application Ser. No. 15/912,558 filed by the author of the present invention. It is similar to the present application but focuses on different aspects of the invention.

Patents US20080149403 and US20080150295A1 by Fein et al titled as: "System and method for creating a networked infrastructure distribution platform of fixed and mobile solar and wind gathering devices" utilize sides of the roads for producing electricity from wind and solar energy. These references propose 1" size wind turbines and several solar energy devices such as: Solar paint over the road markings, solar paint on the blades of wind turbines, solar films wrapped on the guard rails, solar panels attached to the roadside signs or placed on the sides of the roads. These devices suffer from several setbacks that must be addressed to make the system practically feasible. These prior arts do not take into account the safety of the vehicles as required by various transportation authorities, and they do not take into account the safety of the wind and solar installations.

These installations subjected to vehicular damage, and they pose electrocution risk. Many of the devices listed by these prior arts are unpractical or non-existent. As these devices connected to the same Networked Infrastructure Distribution Platform, all the devices within the system must be evaluated for their viability within the Networked Infrastructure Distribution Platform of Solar Energy Gathering Devices as claimed by these prior arts.

FIG. 3 in the prior arts listed above calls for the use of micro sized wind turbines. As illustrated and described, these micro sized wind turbines are only one inch, and one foot in size. Such devices are very small to produce utility scale electricity that can be incorporated into a road electricity grid. For utility scale electricity production wind turbines require very large wing span and they must be installed at hundreds of feet in height. FIG. 4 illustrates a wind turbine made of: "Photovoltaic Covering/Solar Panel Made from silicone, Thin Film, Solar Paint or Other Deployments". This solar energy producing device is impractical because to produce solar energy requires large surface areas. If large surface are is used for the blades of the wind turbines, the wind turbine will become slow and unusable. To collect electricity from the blades of a wind turbine will tangle the wiring connections that must be installed over the blades. Such devices are unknown and impractical.

FIG. 9 of these prior arts describe and illustrate another solar energy producing device: "Photovoltaic Film Formed onto Guardrails along Both Sides of road and Continuous Deployment Median". This solar energy producing device is impractical to produce electricity because photovoltaic thin films require a large surface area to produce utility scale electricity; the guardrails along roads do not provide such large area.

FIG. 10 of these prior arts describe and illustrate another solar energy producing device: "Photovoltaic Paint on all road Lines, 105". This solar producing device is impractical because road markers offer very little surface area to produce sufficient amount of electricity. To collect electricity produced by road markers would require a huge network of electrical wires that must be imbedded into the road surface, and these installations must be waterproofed to prevent leakage of electrical current.

FIG. 12 of prior arts illustrates solar panels along the sides of roads, and photovoltaic paint (item 105) on all road lines, and serving areas. The description also calls for: "These road markers may also be deployed in wider use on the road, particularly in breakdown lanes, to maximize coverage and power gathering potential. The gathered power is transferred via wired connection to battery (Item 33), then to inverters (Item 34) and then to meters (Item 35) which register the amount of energy that is distributed (Item 8) to the utility grid (Item 81), to homes or businesses (Item 83), to vehicles (Item 82) or to and auxiliary energy storage or hydrogen facility (Item 84)." To use photovoltaic paint as a solar energy producing device poses setbacks because this device is subjected to be damage by road traffic, rain water damage and highway dust. To collect electricity from this device would require an extensive network of electric wires which would be cost prohibitive. The service areas as illustrated in FIG. 12 are located right in the middle of highways which would impede traffic as charging of electric vehicles requires significant amount of time.

The road solar energy generation system of the aforementioned prior arts is dependent upon electric batteries as illustrated in FIGS. 12, 13, and described in the prior arts specification. As described, these prior arts use electric battery (Item 33) to collect solar energy and transmit the electricity to utility grid (item 81). This process is described as follows: "FIG. 13 illustrates a flow chart that defines the steps from gathering to distribution of the solar energy in a road system. One or more solar gathering devices such as solarpanels, solar films with backing and solar spray on power cells are installed along a road in a contiguous or semi-contiguous configuration (Item 100). The solar energy generating devices are networked through a road system electricity grid via wiring and input and output connections (Item 9) to efficiently take advantage of batteries and battery arrays as are standard in the solar energy gathering industry (Item 33). The energy stored in the batteries is then passed through an inverter or inverters (Item 34) to condition the energy transmission to a distribution point. As the energy is passed to a distribution point the electricity provided to that point is gauged via the use of an electricity meter (Item 35). Distribution points that may be delivered to include the utility grid (Item 81), a vehicle (Item 82), direct distribution to a business or home (Item 83), hydrogen electrolysis and storage facility or a battery storage facility (Item 84)." If the electricity produced is to be transmitted to an electric grid, then the use of electric batteries is not required. It would require thousands of batteries along the long stretches of highways, making this energy generation system cost prohibitive. The item 'solar spray on power cells' as mentioned above is unknown in the solar industry; such unproven devices may cause failures in the energy system.

FIGS. 17, 18, 19, 20 of prior arts illustrate how wind turbines mounted to the body of a car can be used to produce electricity as part of the road energy generation system. This installation is described as follows: "Portable Wind Gathering Device Mounted to Vehicle" which an attendant must apply to the vehicle and then remove it from the vehicle to collect energy from the device for feeding electricity into the road energy generation system. As illustrated in FIG. 17 an attendant is required to remove "wind turbine installation sheets" or "wind turbine installation placards" from the vehicle and then connect it to an electric unit to gather electricity. Producing electricity by installing micro wind turbines on vehicles is unproven and unpractical.

FIGS. 22, 23, 24, 25 of prior arts illustrate and describe how solar panels mounted on vehicles can be used to supply electricity to the road system for energy generation. The detailed description of the this prior at corresponding to FIGS. 22, 23, 24, 25 describe how the portable solar energy producing devices in accordance with solar installation sheets (item 114) must be installed at service area (item 1001) in accordance with a toll plaza like arrangement. The energy produced by the solar installation sheet is stored in the battery of the vehicle which can be fed into the road system energy grid: "FIG. 25 illustrates a flow chart where one or more solar installation sheets and battery configuration are installed in a vehicle (Item 1095). The vehicle is deployed, registered within the system with the installation sheets installed (Item 1092) and activated to capture and store energy in the batteries (Item 1093). Power is then gathered in the batteries and stored as electricity (Item 1094) for power distribution (Item 8). The batteries then feed the instant vehicle with power that is metered or the batteries are exchanged at a service center (1094) and the power gathered in the batteries is used feed power into the grid (Item 81) after being sent through an inverter which brings the power into the proper technical condition for the grid according to specifications provided by the grid operator, or to power another vehicle (Item 82), direct power a business or home (Item 83) or to have the energy stored in a reserve power form such as batteries or via a manufacture and storage of hydrogen by using the extra power to fuel the electrolysis of water to create hydrogen (Item 84)." The above method of using installing solar installation sheets 114 over vehicles and then feeding the electricity produced by the vehicle mounted solar device to an electric grid is inefficient because solar energy produced would very limited, and it would require the drivers to make constant stops at service areas on roads. Hence the multifaceted plurality of solar devices as claimed in this prior art are inefficient and unpractical to produce utility scale electricity to feed the road system electricity grid as claimed.

The specification of the aforementioned prior arts also calls for installing solar energy devices at locations even where it is not permitted. The specification describes this as follows: "A ground-based solar energy generating device can be attached to any surface that allows collection of solar energy and where its installation does not pose a safety risk or is not permitted by regulations." Installing solar energy producing devices where it is not permitted would be illegal and compromise the safety of drivers. For example the specification section of these prior arts describes one of the solar installation as: "solar panels (Item 100) deployed on the roadside lanes in a continuous manner". Deploying solar panels "on the roadside lanes" is not permitted, and would be illegal. It would compromise the safety of drivers as these lanes are reserved for emergencies.

Prior arts US20080149403 and US20080150295A1 do not take into consideration vehicular safety, and the safety of photovoltaic installations, therefore they are non-analogous with the present invention. These prior arts include several unknown or unproven energy generating devices such as: Micro wind turbines 1" in size mounted on the roadside, solar paint on roadway markers, solar thin film wrapped on roadside guardrails, generating solar energy by applying photovoltaic material on the blades of wind turbines, solar paint on power cells, generating electricity by mounting micro wind turbines on a vehicle. The present invention does not utilize any of these devices as they will hinder vehicular safety, the safety of the drivers, and the safety of photovoltaic installations. It is an object of the present invention to provide a photovoltaic traffic barrier system that ensures the safety of the vehicles, the safety of drivers, the safety of the transportation route, and the safety of photovoltaic installations.

Patent WO2011151677 by K. C. Somaratna relies on "a battery charging system for vehicles comprising solar power conversion mechanisms installed along roads." Solar energy is unpredictable due to weather conditions; this solution may suffer due to total reliance on solar power and batteries without any backup of utility grid. International Searching Authority's written opinion has found this invention lacking innovative step.

Patent US 20100200041 by David Dayton Dearborn proposes putting solar panels on a canopy using a support column in between two train tracks: "A method of generating high potential electrical energy for electric powered rail vehicle traction power comprising a plurality of solar PV (4) covered (2) roof-like structures (3) said herein canopy modules (1-1), in alignment with and above a tie-and-rail vehicle guide track system (15) or right of way." This seems a practical approach to power electric trains; however it may not be suitable for many geographic locations because the solar panels should be installed at an angle directly facing the sun. For example for most of the United States a tilt angle of the panels facing south should be between 32-40 degrees from the horizontal. Hence the canopy as shown would not work. The cantilevered canopy as shown also poses structural span limitations. Hence only limited solar capacity may be installed.

U.S. Pat. No. 8,080,901B2: An electricity generation system that uses smart pavement is presented, which pavement is comprised of materials that use solar radiation, piezo electricity, and temperature differentials within the road surface itself to create electric power.

U.S. Pat. No. 8,381,464B2: Systems and methods for disposing and supporting a solar panel array are disclosed. The embodiments comprise various combinations of cables, support columns, and pod constructions in which to support solar panels. The solar panels can incorporate single or dual tracking capabilities to enhance sunlight capture.

US20150162869A1: This invention teaches a solar cell, a solar module, a solar array, a network of solar arrays, and also a solar power grid suitable for providing power for industrial, residential and transportation use. A solar cell or solar module including a plurality of solar cells can be made in a structure configured to have the appearance of natural foliage.

While the aforementioned prior arts have their own utilities, none of the prior arts is focused on photovoltaic structures that can effectively utilize the sides of the roads and transportation routes that can minimize land costs for the installation, and cut down electrical transmission losses.

BRIEF SUMMARY OF THE INVENTION

It is an object of the present invention to utilize spaces alongside transportation routes such as shoulders of roads, medians of roads, the space in between the train tracks and the spaces alongside train tracks to generate electricity from solar energy. This maximizes the land use of these spaces to generate clean energy reducing land costs for the photovoltaic installations while minimizing electrical transmission losses. Supplemental energy generation installations can also be installed in adjacent properties as part of the infrastructure energy generation system (IEGS), and distributed energy resource (DER) system. In one embodiment of the present invention photovoltaic structures 10' are integrated within the median and shoulders of roads; in another embodiment of the invention the photovoltaic structures 10' are integrated in the space within the train tracks and the spaces alongside train tracks. In one embodiment of the present invention photovoltaic structures 10' are integrated within the traffic barriers alongside roads.

Infrastructure energy generation system (IEGS) enables to generate clean electricity using solar energy along transportation routes and facilitate the use that electricity for transportation along these transportation routes. The electricity generated can be used to charge electric vehicles, to power electric trains, to power electric road vehicles, to supply power to service areas and transportation facilities along these transportation routes. Supplemental electricity can be used to serve local communities. An important component of the present invention is an electric transmission line 13 or a microgrid created along the transportation routes which carries the electricity produced by solar panels. Various configurations for the grid-tied electrical system such as utility grid, a smart grid or a distributed energy resources (DER) system can be used to produce and utilize the electricity produced by photovoltaic structures 10'. Where an electric grid is not feasible an off-grid electrical system backed by electric storage batteries can be used. The intent is to maintain constant electric power in electric transmission line 13 to facilitate transportation. The location of electrical transmission line 13 as depicted in may figures hereinafter is for example only, it can vary as per the requirements of a project.

In one embodiment of the invention photovoltaic structures 10' are supported by vehicle impact barriers (jersey barriers) alongside transportation routes. This makes these installations very economical as these barriers are required along transmission routes anyway. In one embodiment of the invention photovoltaic structures 10' are in the form of inclined solar barriers or canopies that are installed along transportation routes. Electric battery storage facilities can be provided alongside transportation routes to store electricity during daytime hours, and use that electricity when solar power is not available. A combination of electric storage batteries and grid-tied electrical system is within the scope of the present invention.

The author of the present application Vijay Duggal is a registered architect in the United States, licensed in the State of New York. Additional information about the designs disclosed herein can be obtained by contacting him using the following URL: www.innotect.net/duggal. Twitter handle: @ArchitectDugg. All rights for the contents of this application are reserved by the author.

DETAILED DESCRIPTION OF THE INVENTION

Figure 1:
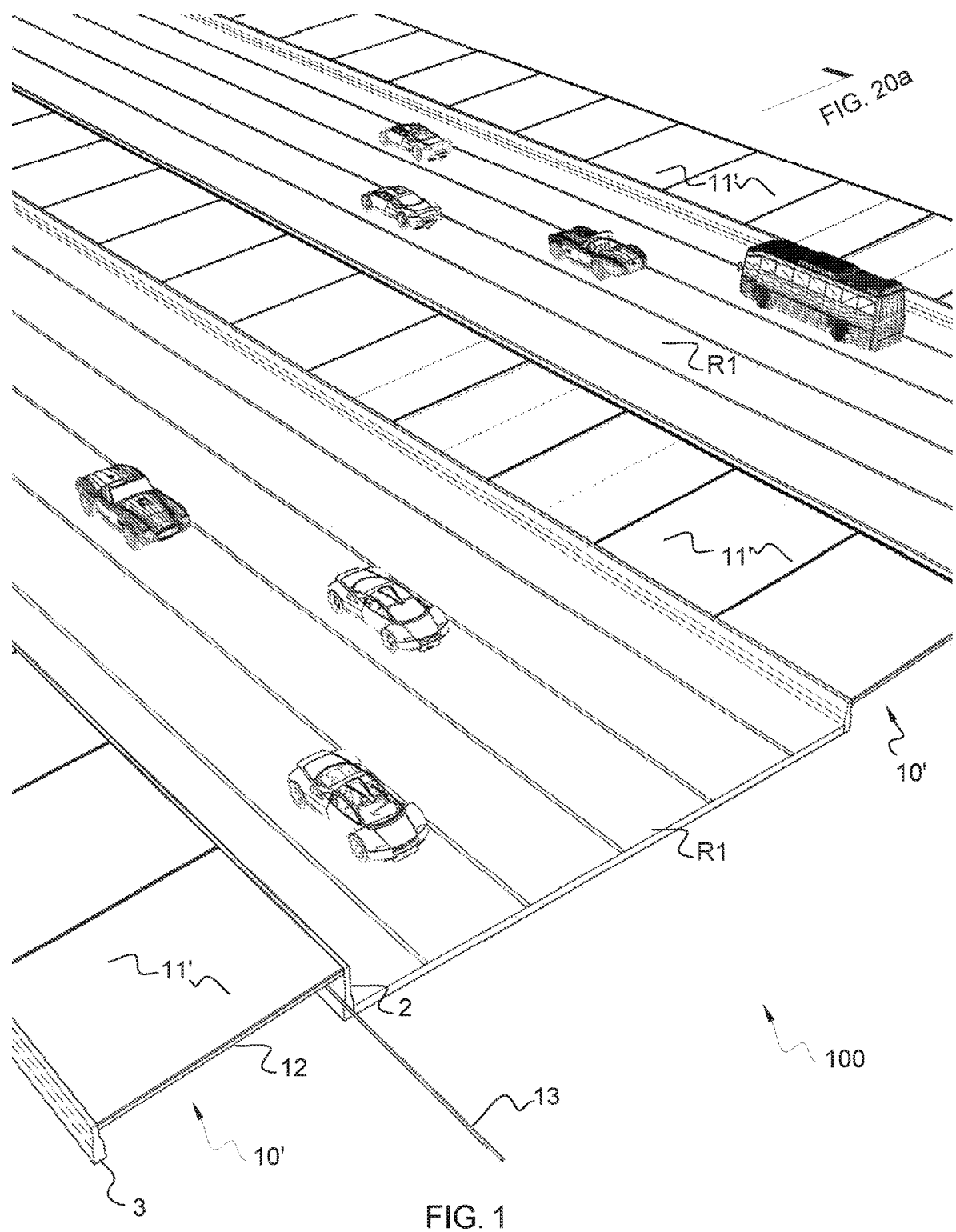
FIG. 1: 3D view of one embodiment of the invention

The following are exemplary embodiments of the present invention. The terminology used to describe various assemblies and components is used in a generic sense; variations in terminology may exist to denote like or similar components in different embodiments of the invention. For example electric transmission line 13 shown in various figures is meant to represent a means to transmit electricity; it could be an electric bus-bar, a microgrid or simply a transmission line comprised of plurality of conductors including electrical ground or neutral as required for safe transmission of electricity. The term photovoltaic structure(s) 10' is meant to represent solar array(s) supported by a structural system in a generic sense. Some examples of photovoltaic structures (10') are illustrated in the present application; other shapes and forms of photovoltaic structures are within the scope of the present invention. Solar arrays are comprised of plurality of solar panels 11' placed together in predetermined arrangement, and electrically connected together. The terms solar arrays and photovoltaic structures are generally interchangeable in the context of the present application. The term solar panel(s) 11' refers to any devices capable of converting solar energy into electricity, including solar thin films. The solar panels may be based on technologies such as monocrystalline solar cell (mono-Si), crystalline silicon solar cell (c-Si), thin-film solar cell (TFSC), amorphous silicon solar cell (a-Si), organic solar cell (OPV), concentrated PV cell (CVP and HCVP), copper indium gallium selenide solar cells (CI(G)S), dye-sensitized solar cell (DSSC), photoelectrochemical cell (PEC), etc. Road R1 as shown in various FIGS. does not represent a specific road, but a road in a generic sense. For clarity, like elements in drawings are generally labeled only once. Components that are insignificant to the core spirit of the invention are omitted to avoid clutter. The present invention uses terms such a 'cess' along train tracks and 'shoulders' along roads/highways in a generic sense. They are intended to represent linear spaces along train tracks, roads and boundaries of properties. Properties nearby transportation routes can also be used to install solar arrays and other energy producing devices to enable infrastructure energy generation system (IEGS) being part of a distributed energy resource (DER) system.

Reasonable professional judgements can be made for errors and omissions by cross-referencing different embodiments of the present invention, drawings and claims in light of the spirit of the present invention. In the event a reference in the figures does not correctly correspond with the description or vise versa, that reference can be omitted without invalidating the core principles and claims of the present invention. Professional judgements regarding errors and omissions can be made by comparing one element serving a similar function with other examples illustrated and descried elsewhere in the present application.

FIGS. 1, 20a, 20b, 20c disclose an embodiment of the present invention in accordance with infrastructure energy generation system 100 in which photovoltaic structures 10' are integrated within the shoulders and median of roads R1. Solar panels 11' are supported by structural frames 12 spanning between vehicle impact barriers 2 and 3 forming photovoltaic structures 10'. Structural frames 12 are preferably attached to vehicle impact barrier 2 and 3 by using structural isolation joints 16a (FIG. 20c) to prevent damage to solar panels 11' in case there is a vehicular impact on barrier 2 or 3. Solar panels 11' are supported over runners 11c which are attached to structural frames 12. Structural frames 12 can be structural steel joists, c-channels or metallic tubes, or they can be made by welding steel sections/tubes together. Or they can be in the form of structural trusses. Structural steel frames 12 are joined together with cross bracing members 12w. The energy produced by solar panels 11' is supplied to electric transmission line 13. In this embodiment of the invention vehicle impact barrier 2 is taller than barrier 3 creating a slope which is preferred to face sunward direction. This configuration is suitable for roads running substantially in the E-W direction as it can enable maximum solar exposure for solar panels 11' by facing them south (in the northern hemisphere). The slope as indicated however can be eliminated, and photovoltaic structure 10' can be made with a flat top making it suitable to receive solar exposure from all directions. FIGS. 21a, 21b, 22a, 22b, 22c, 23a, 23b, 23c illustrate variations of IEGS system 100 describing how the inclination and orientation of photovoltaic structures 10' can be configured to make them suitable for roads running in different directions.

Figure 2:
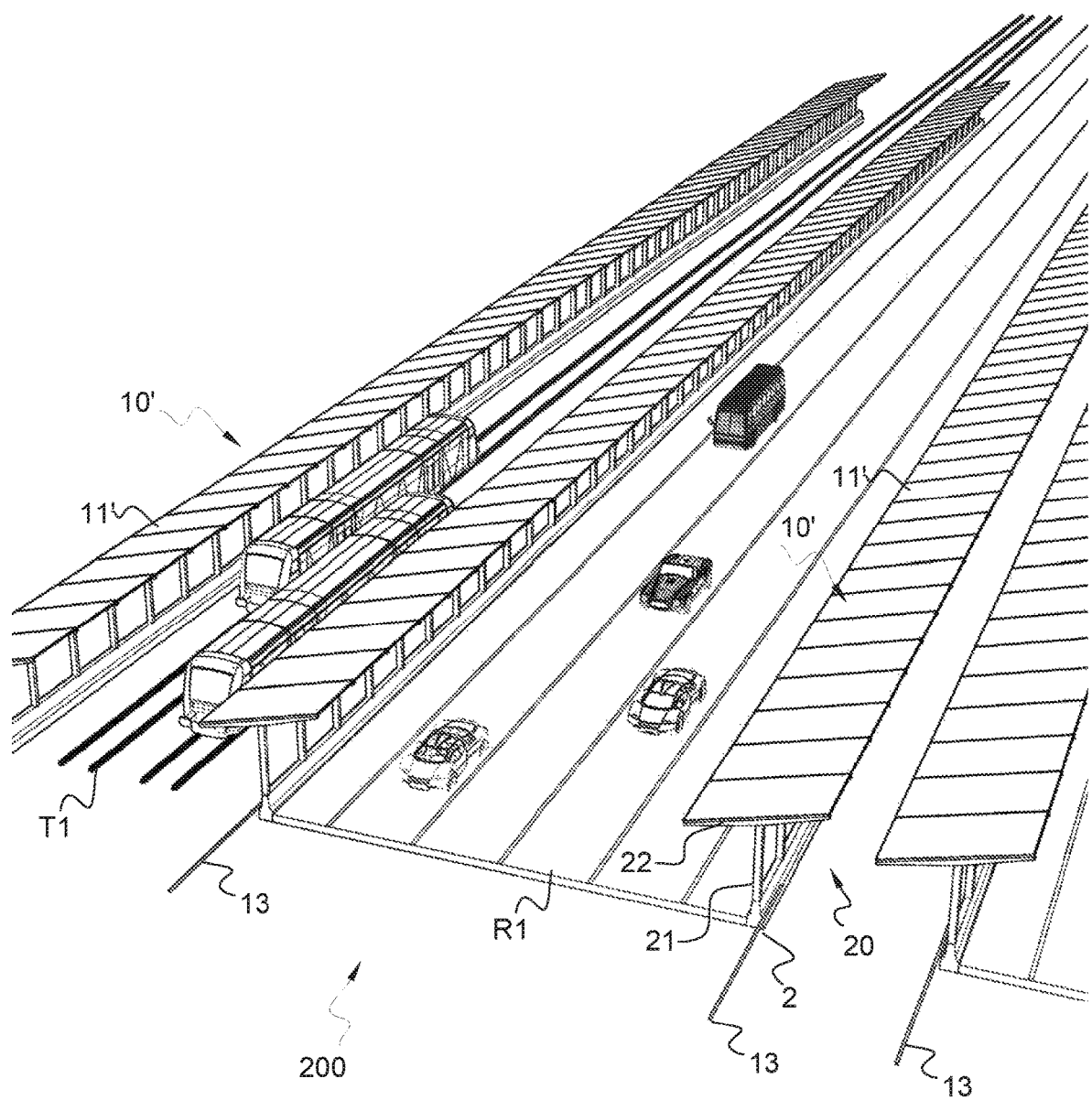
FIG. 2: 3D view of one embodiment of the invention

FIG. 2 discloses an embodiment of the present invention in accordance with infrastructure energy generation system 200 in which photovoltaic structures 10' are installed over canopy structures 20. Canopy structures 20 are comprised of vertical supports 21 which are integrated within vehicle impact barriers 2, and inclined frames 22 which are supported over vertical supports 21. Canopy structures 20 can be installed along both sides of roads R1 and train tracks T1 to maximize electricity output. Electricity produced by solar panels 11' is transmitted through electrical transmission lines 13.

Figure 3:
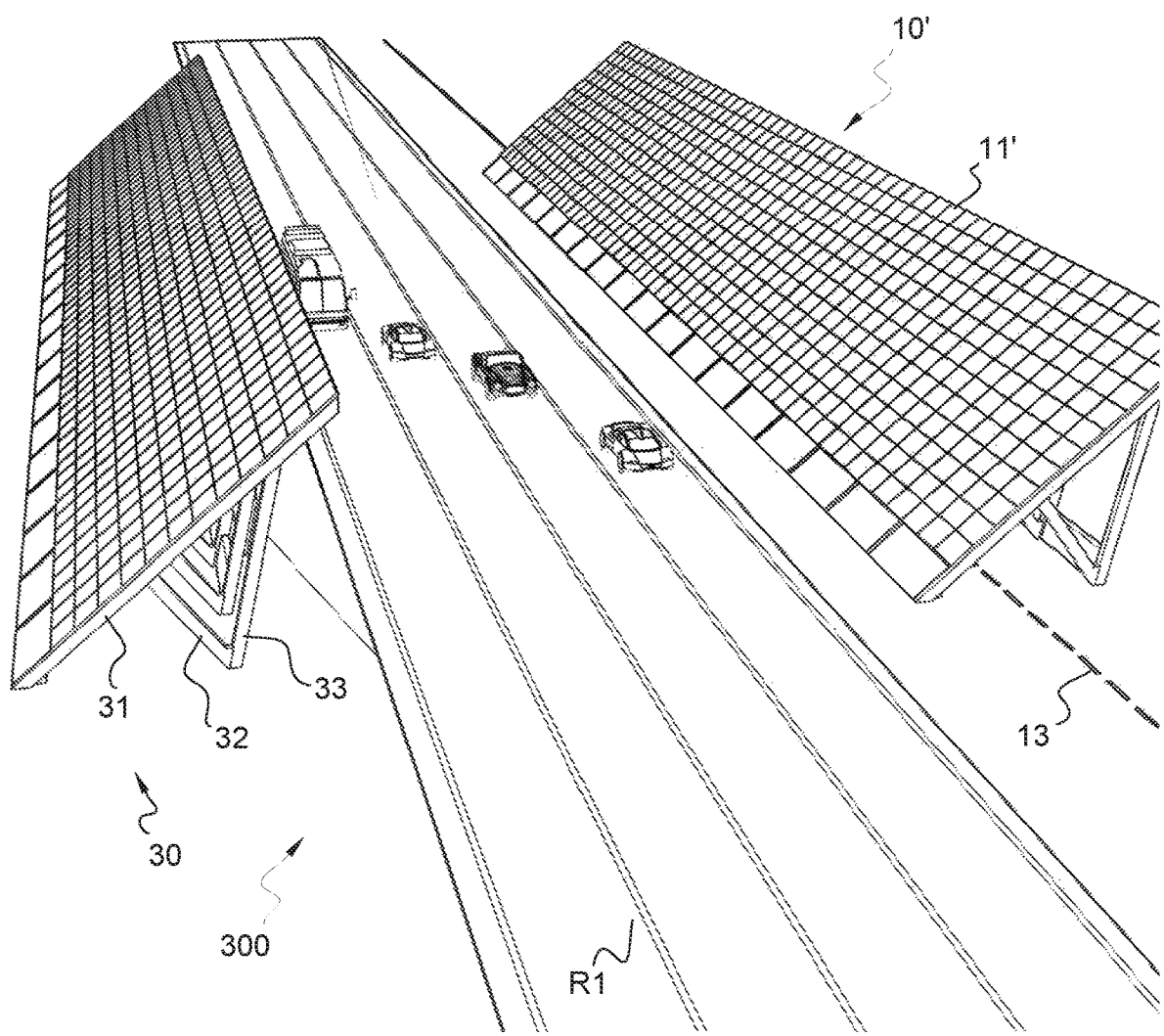
FIG. 3: 3D view of one embodiment of the invention

FIG. 3 discloses an embodiment of the present invention in accordance with infrastructure energy generation system 300 in which photovoltaic structures 10' are installed over inclined barrier structures 30. Inclined barrier structures 30 are supported by inclined frames 31 and lateral bracing members 32 and 33. Electricity produced by solar panels 11' is transmitted via electric transmission line 13. Please note that designation '13' in various embodiment of the present invention is used in a generic sense to indicate a means of transmitting electricity. It can be located at different predetermined locations.

Figure 4A:
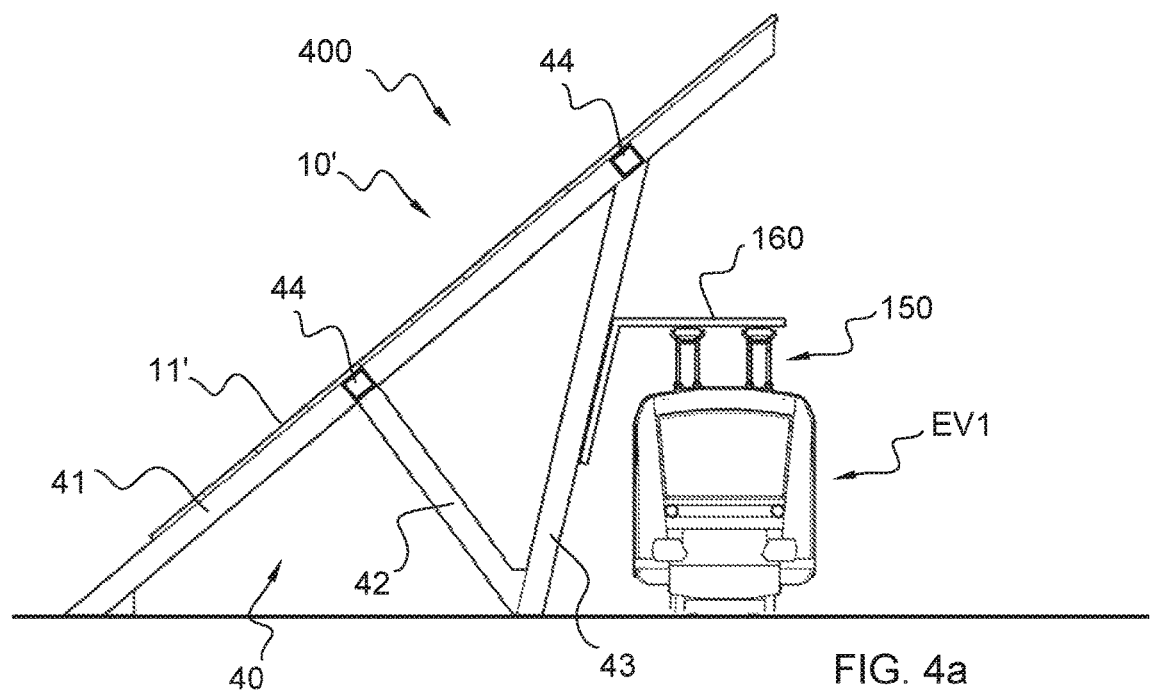
FIG. 4a: Sectional view of one embodiment of the invention
Figure 4B:
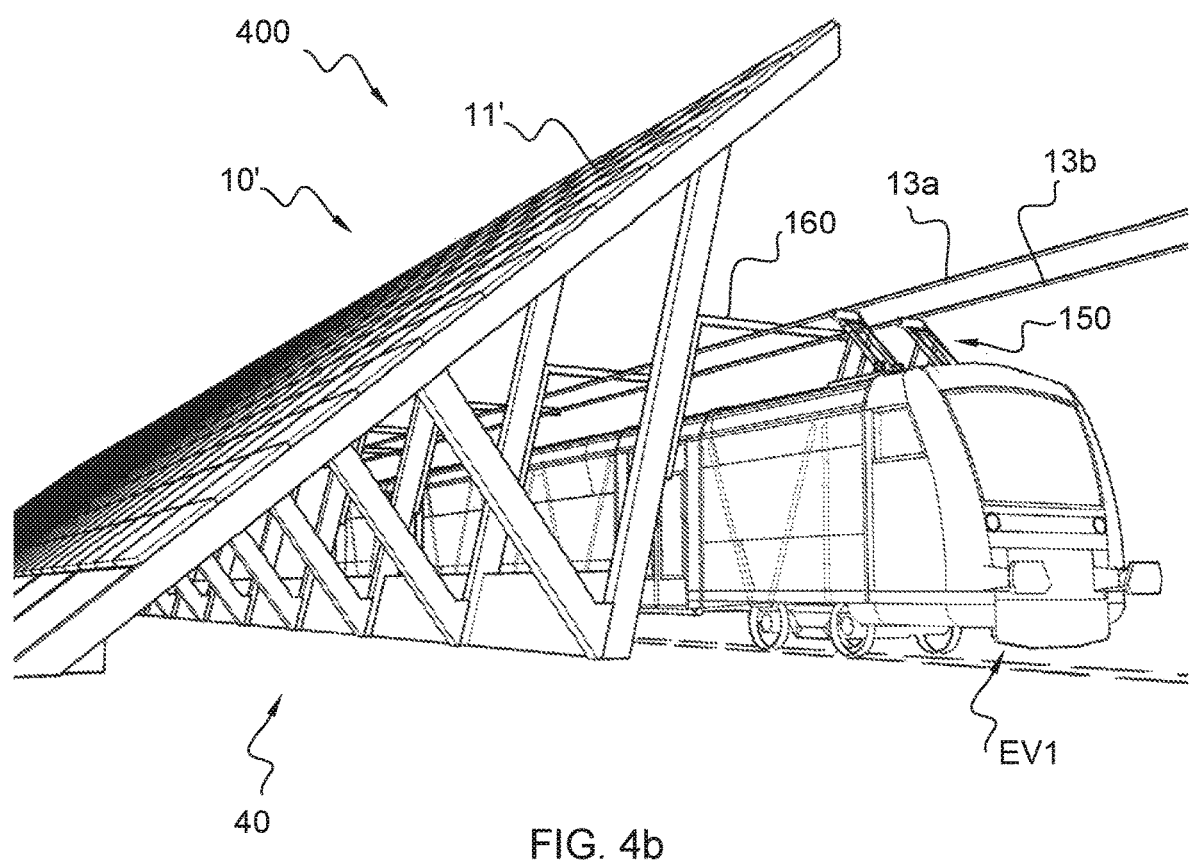
FIG. 4b: 3D view of the embodiment of the invention disclosed in FIG. 4a
FIG. 5a: Sectional view of one embodiment of the invention

FIGS. 4a, 4b disclose an embodiment of the present invention in the form infrastructure energy generation system 400 in which photovoltaic structures 10' are installed over inclined barrier structures 40. Inclined barrier structures 40 are supported by inclined frames 41 and lateral bracing members 42, 43 and cross bracing members 44. Electricity produced by solar panels 1' is supplied to electric supply lines 13a, 13b one of which acts as phase line and the other acts as neutral. Electric supply lines 13a, 13b can be connected to a backup battery and/or to an electric grid to ensure electric power when sufficient solar power is not available. Electric supply lines 13a, 13b are supported by brackets 160 which are supported from lateral bracing members 43. Electric supply lines can be connected to a main electric transmission line 13 as shown in FIG. 3 and other embodiments of the present invention. Electric road vehicle EV1 is equipped with pantograph assembly 150 which is configured to draw electricity from electric supply lines 13a, 13b. This enables electric road vehicle EV1 to run and charge while driven on a road. Electric road vehicle EV1 can be a trackless tram, a truck, a bus or any other such electric road vehicle.

Figure 5A:
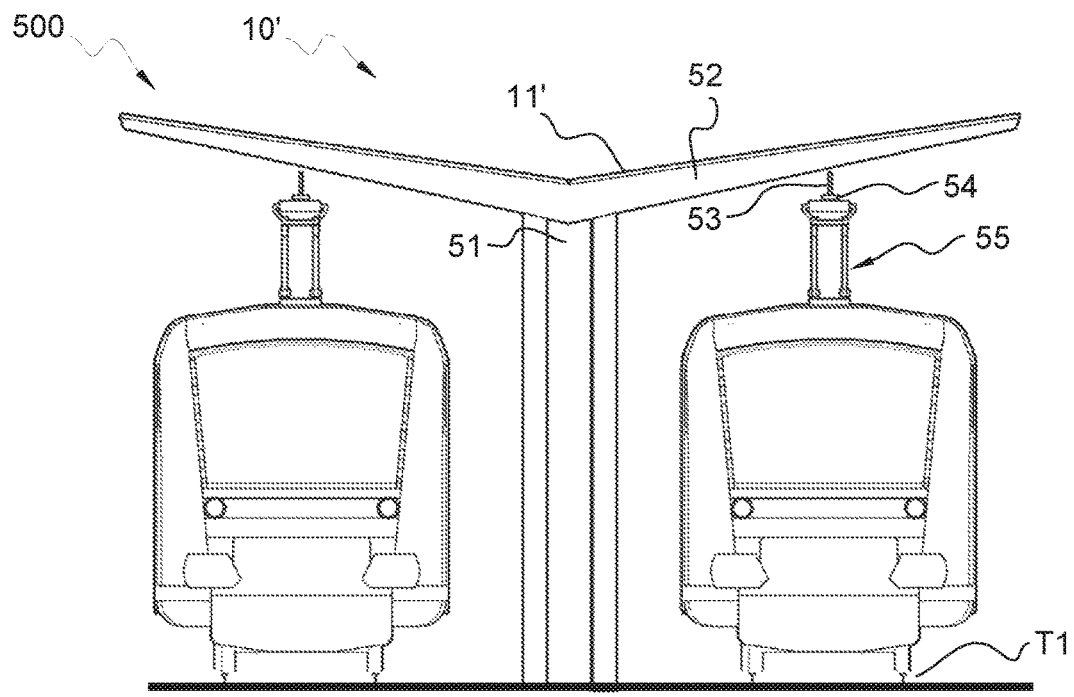
FIG. 5b: 3D view of the embodiment of the invention disclosed in FIG. 5a
FIG. 6: Schematic section of the embodiment of the invention disclosed in FIGS. 5a, 5b
FIG. 7a: Sectional view of one embodiment of the invention
Figure 5B:
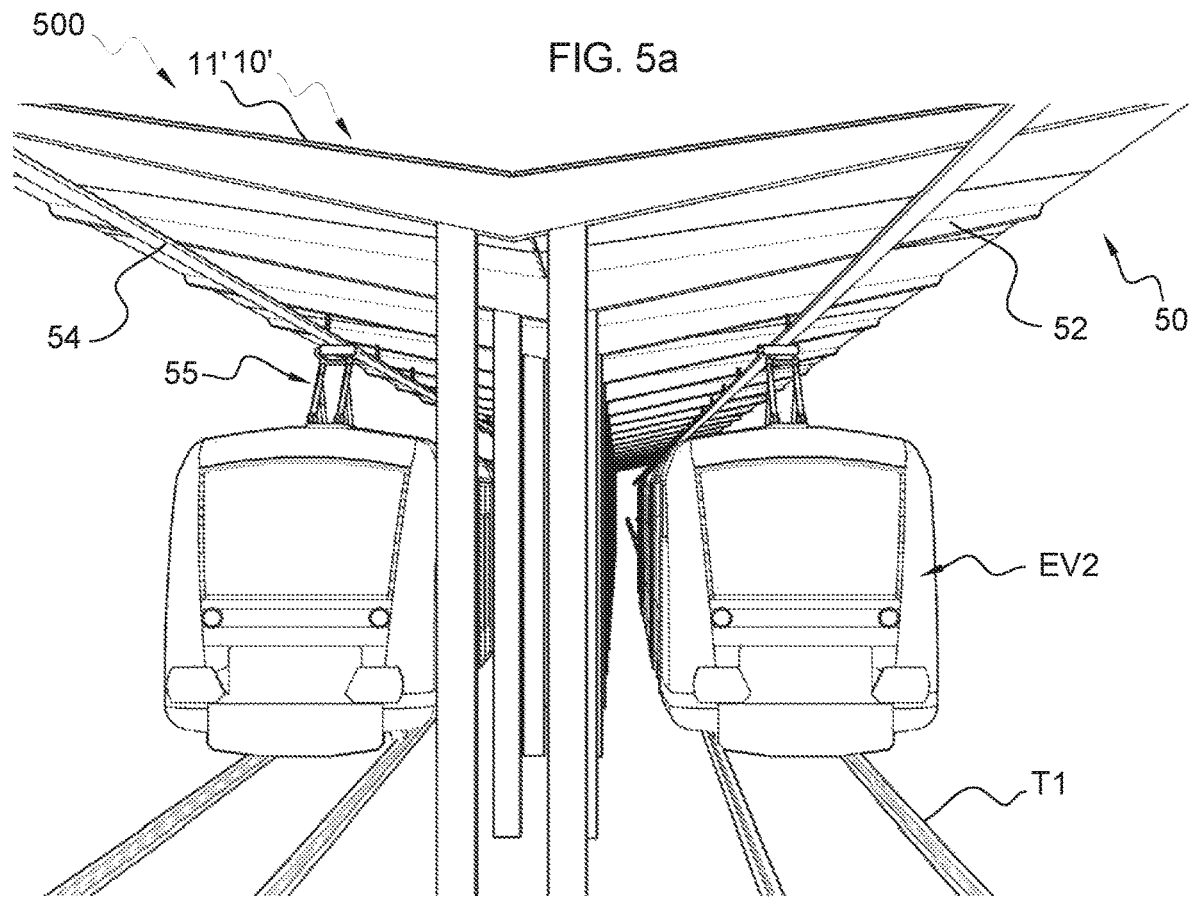
Figure 6:
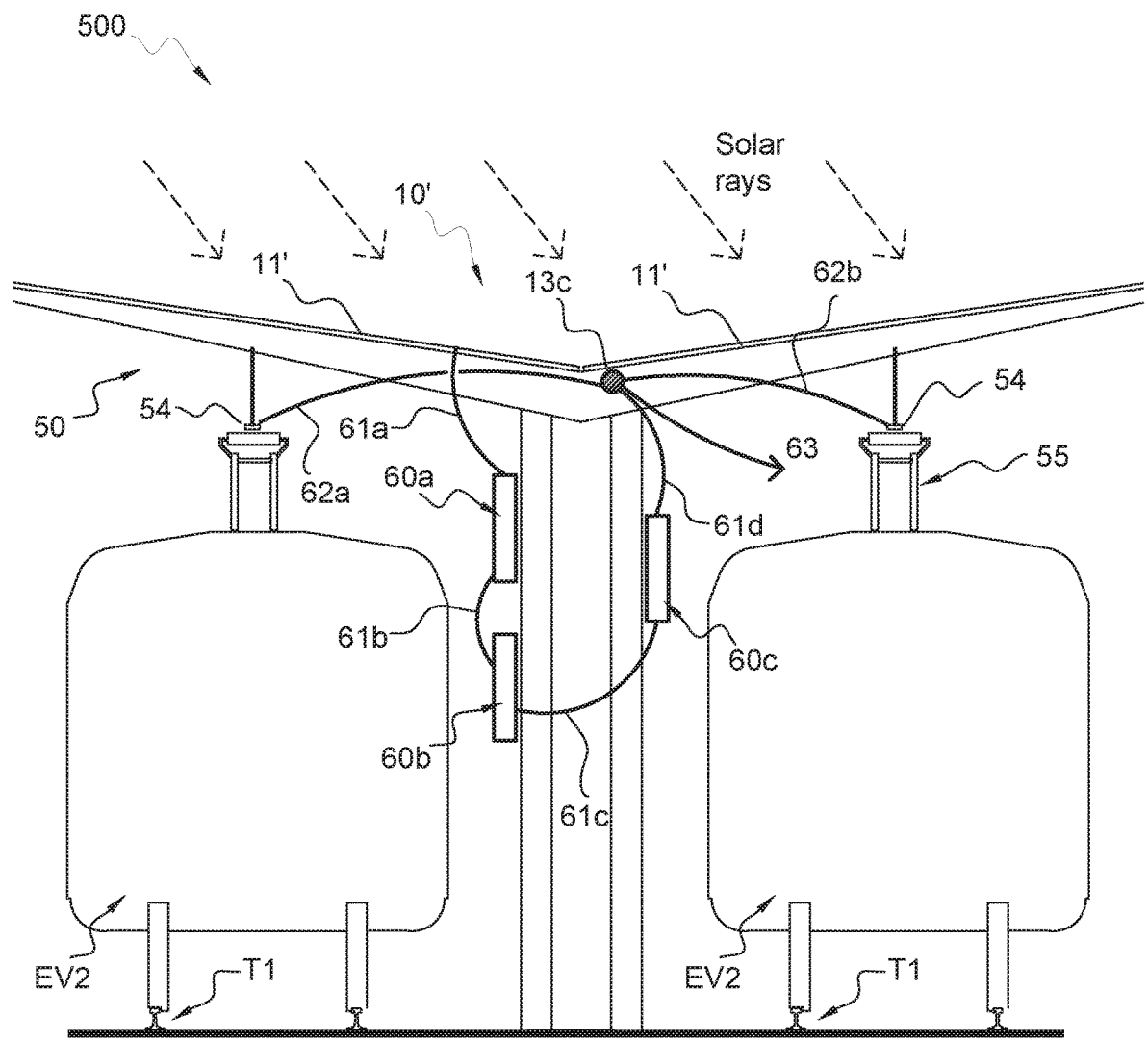

FIGS. 5a, 5b, 6 disclose an embodiment of the present invention in accordance with infrastructure energy generation system 500. IEGS 500 is comprised of photovoltaic structures 10' which are comprised of canopy structures 50 and solar panels 11'. Solar panels 11' are supported by canopy structure 50. Canopy structure 50 is comprised of vertical supports 51 and canopy framing members 52. Panels 11 can be backed by a structural substrate or framing members to enable solar panels 11' to be tilted by a predetermined degree to maximize solar exposure. Electric trains or trams EV2 are equipped with pantograph assembly 55. Electrical contact rail (or cable) 54 is supported from framing members 52 by using vertical supports (or droppers) 53. Contact rail 54 is configured to receive electrical power generated by solar panels 11' as well as from an electrical backup system such as a battery, a microgrid, or smart grid, or smart grid or a utility grid. Pantographs 55 and contact rails 54 are configured to enable contact with each other to power and charge electric trains EV2 while they are driven on tracks T1. FIG. 6 discloses schematic of electrical connections to utilize electric power produced by solar panels 11' to power electric vehicles EV2. Electricity produced by solar panels 11' is conditioned for transmission by using a number of predetermined devices 60a, 60b, 60c such as combiner boxes, disconnect switches, inverters and electric transmission optimizers such as Maximum Power Point Tracking (MPPT), and transformers. These devices are electrically connected to electric transmission line 13c using a number of predetermined electric circuits 61a, 61b, 61c, 61d. electric transmission line 13c is high voltage electric line which is connected to electrical contact rails (or cables) 54 by using circuits 62a, 62b. A transformer (not shown) between electric transmission line 13c and electrical contact rails (or cables) 54 can be used to further condition electricity to a predetermined voltage. High voltage electric transmission line 13c is connected to a microgrid, a smart grid, or a utility grid by using circuit 63. Electric transmission line 13c can also be electrically connected to electricity produced by IEGS systems 100 or 200 when these systems are run parallel with IEGS system 500. This combined power can be substantial to run several electric trains or trams. When excessive solar power is available electricity produced by solar panels 11' is transmitted to microgrid, smart grid, utility grid or backup batteries; when solar power is not available electricity produced by solar arrays 10 is utilized from microgrid, smart grid, utility grid or backup batteries to power electric vehicles EV2.

Figure 7A:
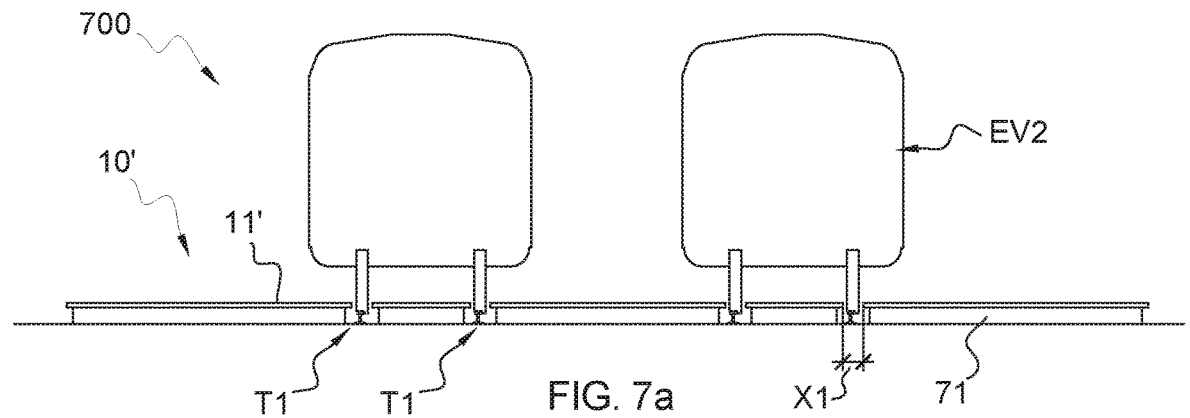
FIG. 7b: 3D view of the embodiment of the invention disclosed in FIG. 7a
FIG. 8: Road layout plan of one embodiment of the invention
Figure 7B:
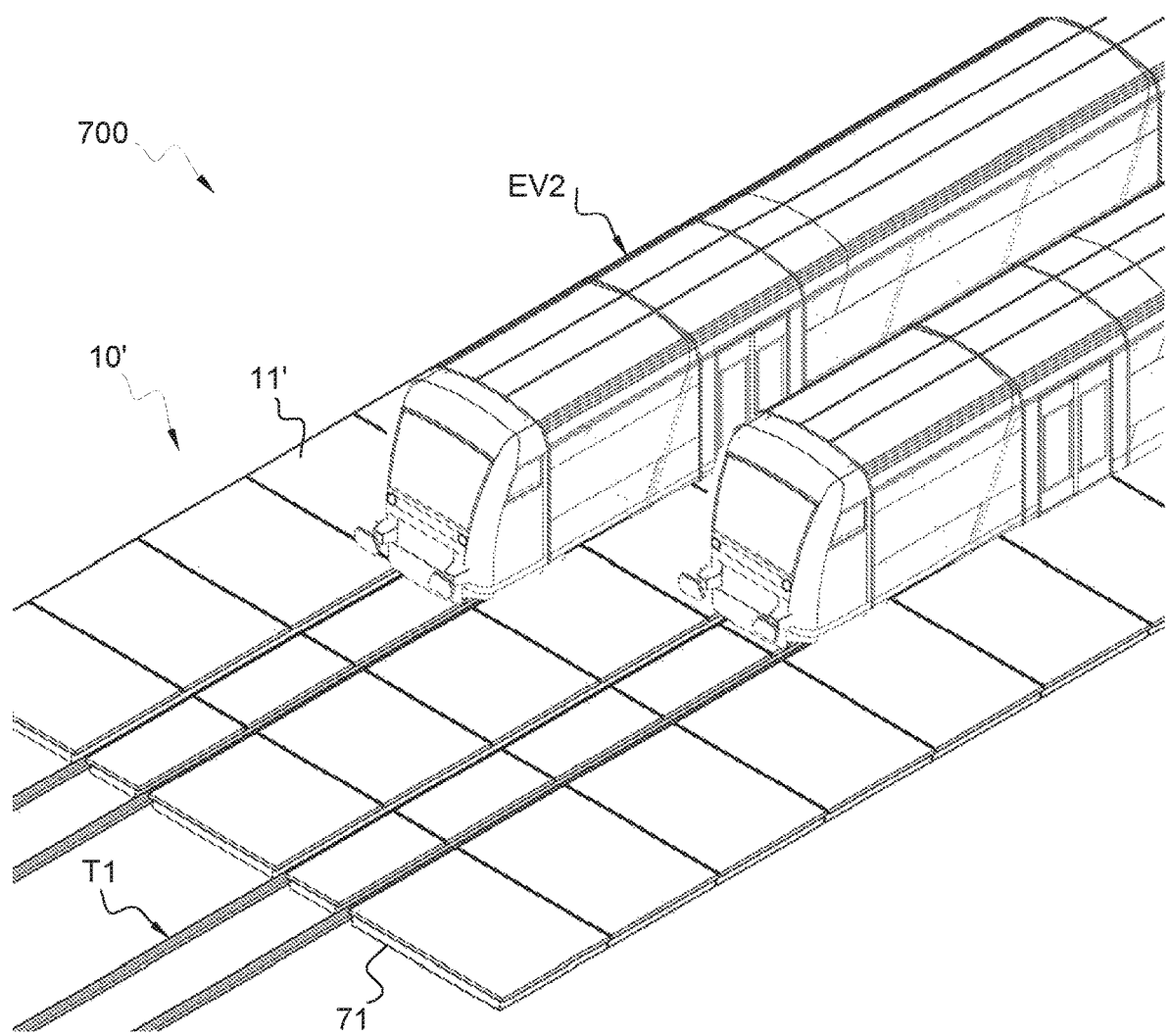

FIGS. 7a, 7b disclose an embodiment of the present invention in accordance with infrastructure energy generation system 700. System 700 utilizes the space along train tracks known as CESS to install photovoltaic structures 10' and utilizes the solar energy produced by solar panels 11' to power electric vehicles EV2. Optionally system 700 can also utilize space between the train tracks to install photovoltaic structures 10' as shown. The objective is to maximize the area for photovoltaic structures 10' to increase electricity production from solar energy. System 700 utilizes land that otherwise remains wasted and produces electricity proximal to where it is needed minimizing transmission losses. Solar panels 11' are supported by supports 71 and are installed to maintain predetermined gaps 'X1' in between solar panels 11' and train tracks T1 such that train wheels are able to pass through photovoltaic structures 10'. The electrical lines to supply power to electric trains EV2 can be conventional overhead power lines or third trail system. The functionality of system 700 in terms of electrically connecting solar panels 11' to an electric transmission line, a microgrid, a smart grid, a utility grid or a backup battery is similar to system 500 as described hereinbefore.

Figure 8:
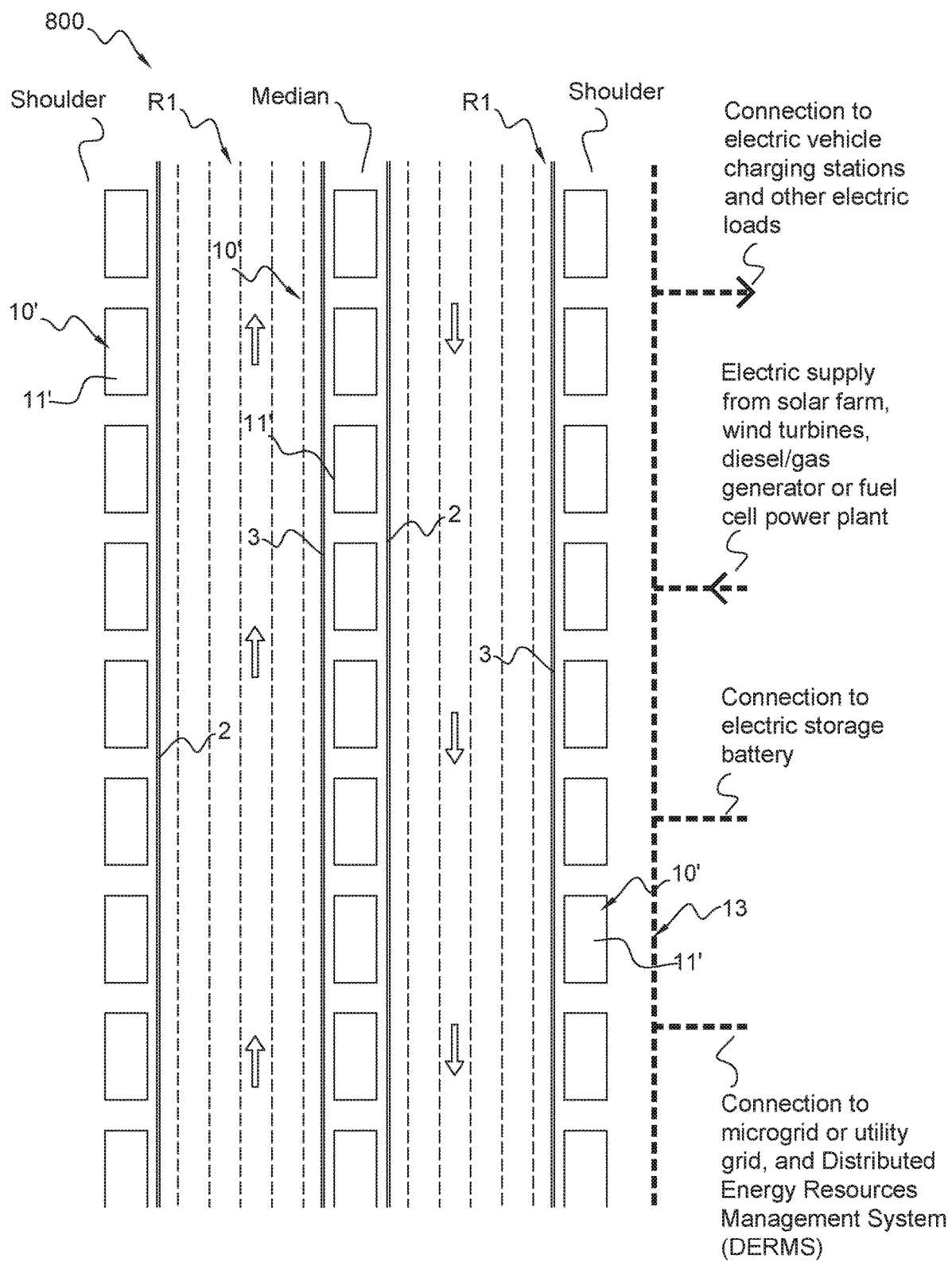
Figure 9:
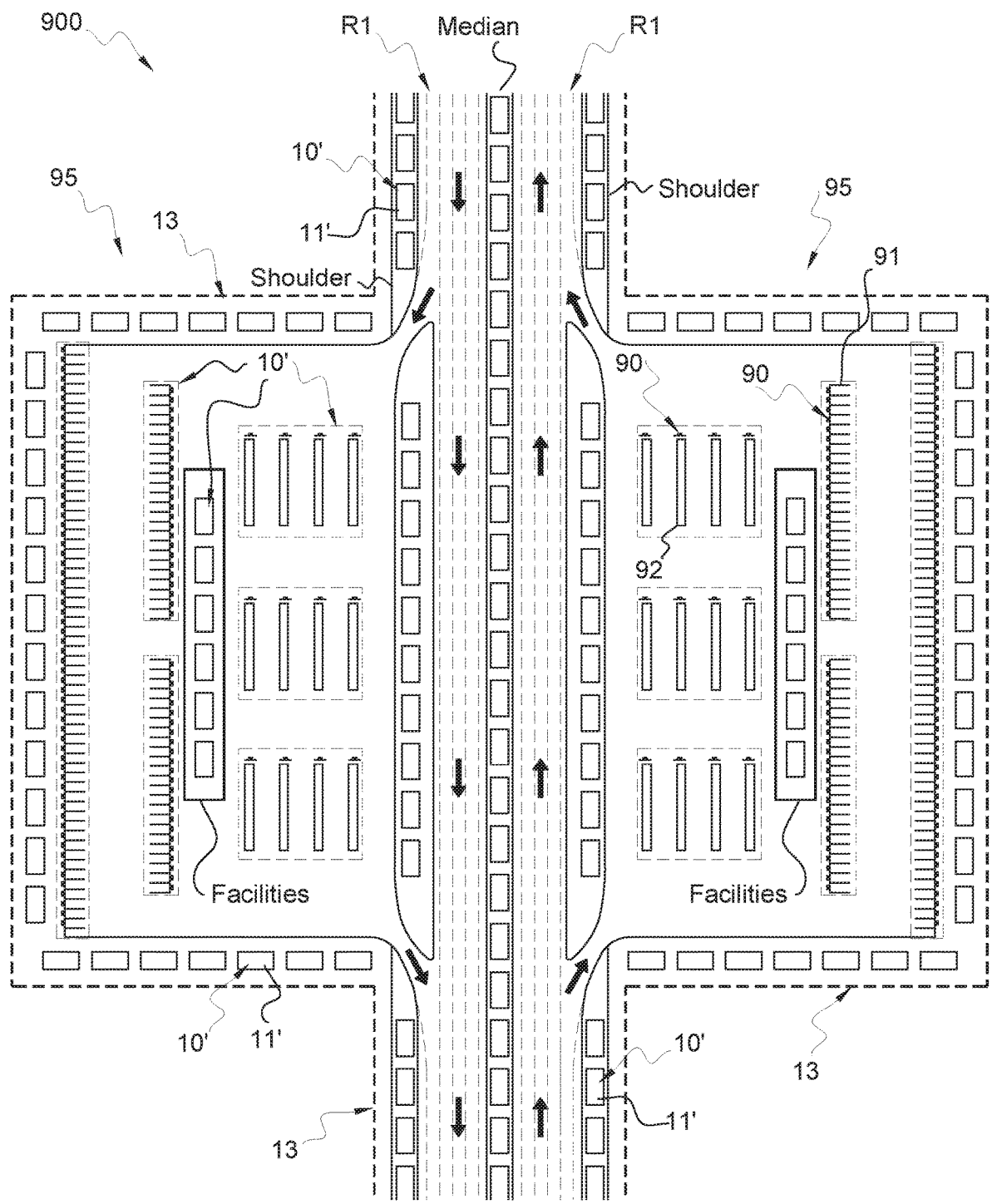
FIG. 9: Layout plan of one embodiment of the invention showing service area

FIG. 8 discloses an embodiment of the present invention in accordance with infrastructure energy generation system 800. System 800 utilizes shoulders and median of roads R1 to produce electricity from photovoltaic structures 10', and supply that electricity to electric transmission line 13 along these transportation routes. Plurality of photovoltaic structures 10' comprising plurality of solar panels 11' are installed along roadways R1. Photovoltaic structures 10' are spaced at predetermined intervals and are oriented such that solar panels 11' face sunward direction for maximum solar gain. Photovoltaic structures 10' are supported by predetermined conventional structural frames, lateral supports, vertical posts, cross bracing members and metallic runners to form an inclined plane facing sunward direction to support solar panels 11'. Photovoltaic structures 10' are designed to withstand wind loads and other structural stresses. Photovoltaic structures 10' can be in the form of modular premanufactured units which can have predetermined shape, and which can be readily assembled in field. All solar panels 11' are electrically connected to electric transmission line 13 by using predetermined electrical circuits. Photovoltaic structures 10' are preferably protected by vehicle impact barriers 2,3 similar to as illustrated in FIGS. 1, 21a, 21b and 22b. Energy generation system 800 can be configured as a distributed energy resource (DER) which is configured to receive electricity from one or more solar farms, wind turbines, diesel/gas generators or fuel cell power plant, or other electricity generation sources along roads R1. System 800 can also be configured as microgrid in which photovoltaic structures 10' along with other aforementioned power sources supply power to microgrid 13. The objective is to maintain electricity in transmission line 13 when solar power is not available. Energy generation system 800 is connected to electricity storage batteries to store and distribute electricity. Electricity transmission line 13 is connected to electric vehicle charging station or other electric loads to facilitate transportation along roads R1. In one embodiment of the invention energy generation system 800 is connected to a microgrid which can be further connected to a utility grid or a smart grid which uses a Distributed Energy Resources Management System (DERMS) software to manage the flow of electricity. The electricity produced by energy generation system 800 can be used to power facilities and vehicle charging stations 95 as shown in FIG. 9. The electricity produced by energy generation system 800 can also be used to supplement power for energy generation systems 100, 200, 300, 400, 500 and 700.

One or more solar farms, wind farms or other power generation sources located along roads R1 contribute electricity to electric transmission line 13 which can also act as a microgrid. It is object of the present invention to maximize the electricity generation potential of infrastructure energy generation systems disclosed herein by involving adjacent communities into the effort. Electric transmission line is preferably connected to an electric grid by using a two-way electric transmission configuration. The present invention utilizes a liner microgrid that is supported by plurality of electricity generation sources along transportation routes. The electricity is used to power transportation, equipment, facilities and communities along these transportation routes; and is managed by distributed energy resources management system (DERMS). Distributed energy resources management system (DERMS) serves to reduce peak demand during normal grid-connected operation or during a demand response event.

FIG. 9 discloses an embodiment of the present invention in accordance with infrastructure energy generation system 900. Service plazas 95 can be created along highways R1 as shown in FIG. 8. Black arrows denote flow of traffic for multi-lane roads R1. System 900 utilizes spaces around and within service plazas (service areas) 95 to generate electricity from photovoltaic structures 10' and uses that electricity to charge electric vehicles. Service plazas 95 are created along roads R1 as shown to integrate rest areas and electric vehicles charging stations so that while drivers can take a break from driving while vehicles are charged. Such configurations can be implemented for shopping centers and other facilities along the transportation routes. FIG. 9 shows an example layout of service plazas 95. Plurality of electric vehicle charging stations 90 are installed proximal to car parking spaces 91, and trucks and semi-trailer trucks parking spaces 92. Service plaza comprises facilities such as convenience stores, restaurants and toilets to allow drivers to take a break while electric vehicles are being charged. Service plazas may be designed to facilitate battery switching stations, car rentals, park-and-ride facilities and car rentals. Photovoltaic structures can 10 continue along perimeter of service plazas 95 and along roads R1 to a predetermined distance. Solar arrays can also be provided on the roof of facilities, and over vehicle charging spaces 91, 92 by creating canopies over these spaces. This embodiment transforms serve plazas into a solar-farm like configuration in which electricity is produced right where it is needed. IEGS 900 can function as a stand alone system by using an off-grid or grid-tied configuration. IEGS 900 can also be used in combination with other systems such as IEGS 400, 500 and 800 to facilitate park-and-ride facilities. All such facilities can be designed to utilize electricity produced by photovoltaic structures 10'. Service plazas 95 can also be designed as shipping transfer points for the shipping companies in which they can transfer goods for various destinations right along the highways without the need for going into inner cities. Electric shipping trucks can be charged or their batteries can be switched while the goods are being loaded and unloaded.

Figure 10:
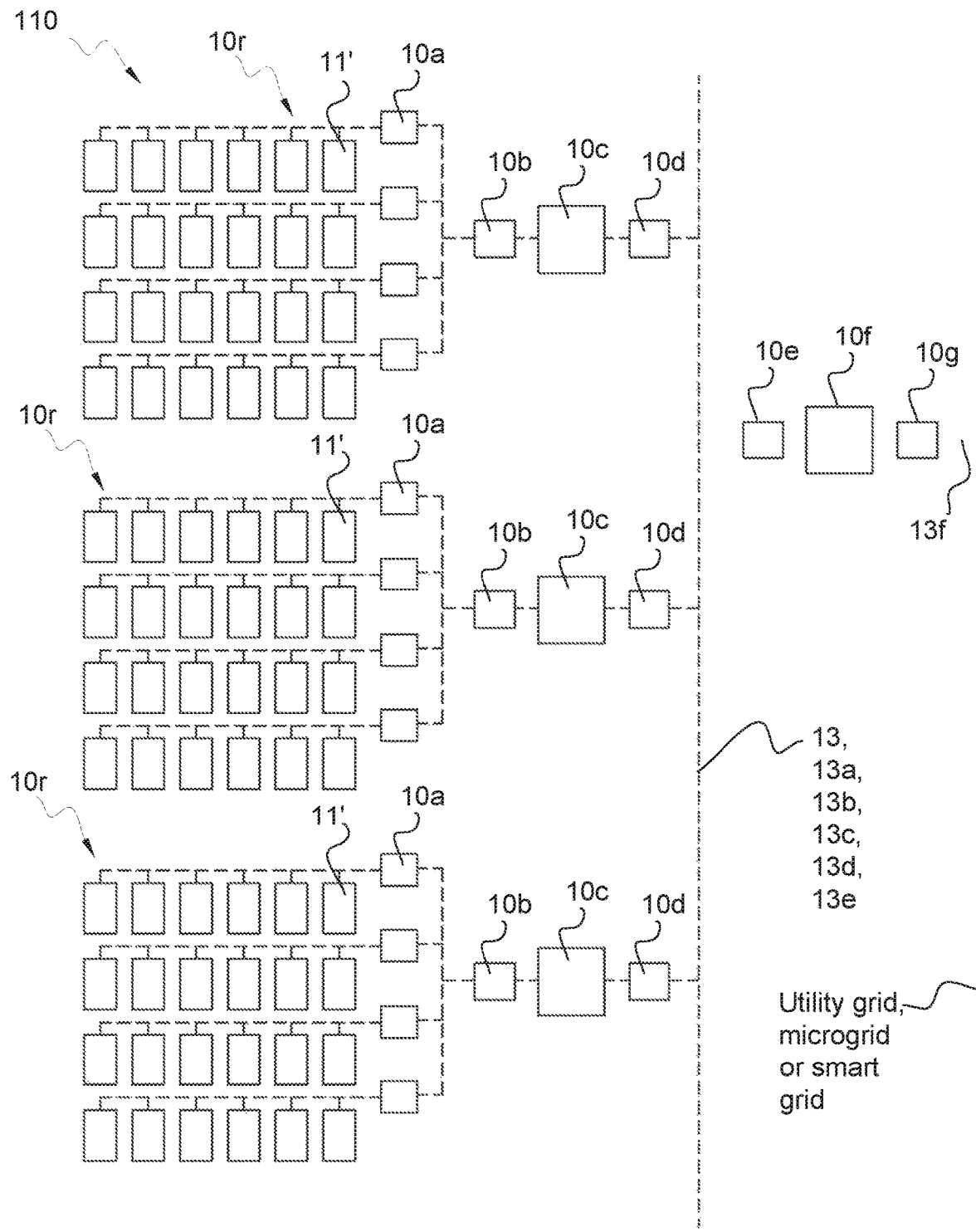
FIG. 10: Schematic diagram of one embodiment of the invention

FIG. 10 discloses an exemplary schematic of grid-tied system 110 showing how plurality of solar panels 11' can be electrically connected to electric transmission line(s) 13, 13a, 13b, 13c, 13d, 13e to directly power electric vehicles as shown in various embodiments of the present invention (FIGS. 4a, 4b, 5a, 5b, 6, 7a, 7b, 13, 14), and to supply power to electric vehicle charging stations 90 (FIG. 9). Plurality of solar panels 11' are connected together by combiner boxes 10a to form solar array 10r. Solar arrays 10r may contains couple of dozen solar panels 11' or it may contain couple of hundreds solar panels 11'. Solar panels 11' can be connected together within array 10r by using a predetermined combination of 'series' and 'parallel' electrical circuits. Several hundreds or thousands of solar arrays 10r can be installed along transportation routes R1 as shown in various embodiments of the present invention to generate substantial amount of electricity which can be used to power electrical trains, trams, buses, trucks, EV1, EV2 (FIGS. 4a, 4b, 5a, 5b, 6, 7a, 7b, 13, 14) or to charge electric vehicles in service area 95 (FIG. 9). Electricity produced by solar arrays 10r is conditioned for transmission by using predetermined devices 10b, 10c, 10d before it is supplied to electric supply lines 13, 13a, 13b, 13c, 13d, 13e. Devices 10a, 10b, 10c can be disconnect switches, inverters, converters, transformers, controllers, circuit breakers, electric meters or other such switchgear. Electric transmission line(s) 13, 13a, 13b, 13c, 13d, 13e are connected to a utility grid, microgrid or smart grid by using another set of electrical devices 10e, 10f, 10g and electrical connection line 13f. Devices 10e, 10f, 10g can be disconnect switches, transformers, controllers, circuit breakers, electric meters and other such switchgear to enable two-way transmission of electricity in between electric transmission line(s) 13, 13a, 13b, 13c, 13d, 13e and a utility grid, microgrid, or smart grid. When excessive electricity produced by solar panels is available it is transferred to the utility grid, microgrid, or smart grid. When solar power is not available, electricity from utility grid, microgrid, or smart grid is supplied to electric transmission line(s) 13, 13a, 13b, 13c, 13d, 13e. In another embodiment of the present invention when a utility grid, a microgrid, or smart grid, or smart grid is not feasible, an off-grid system can be deployed. One or more electrical batteries can be connected to transmission line 13 or circuit 13f to store electricity when solar power is available, and utilize that power when solar power is not available.

Figure 11:
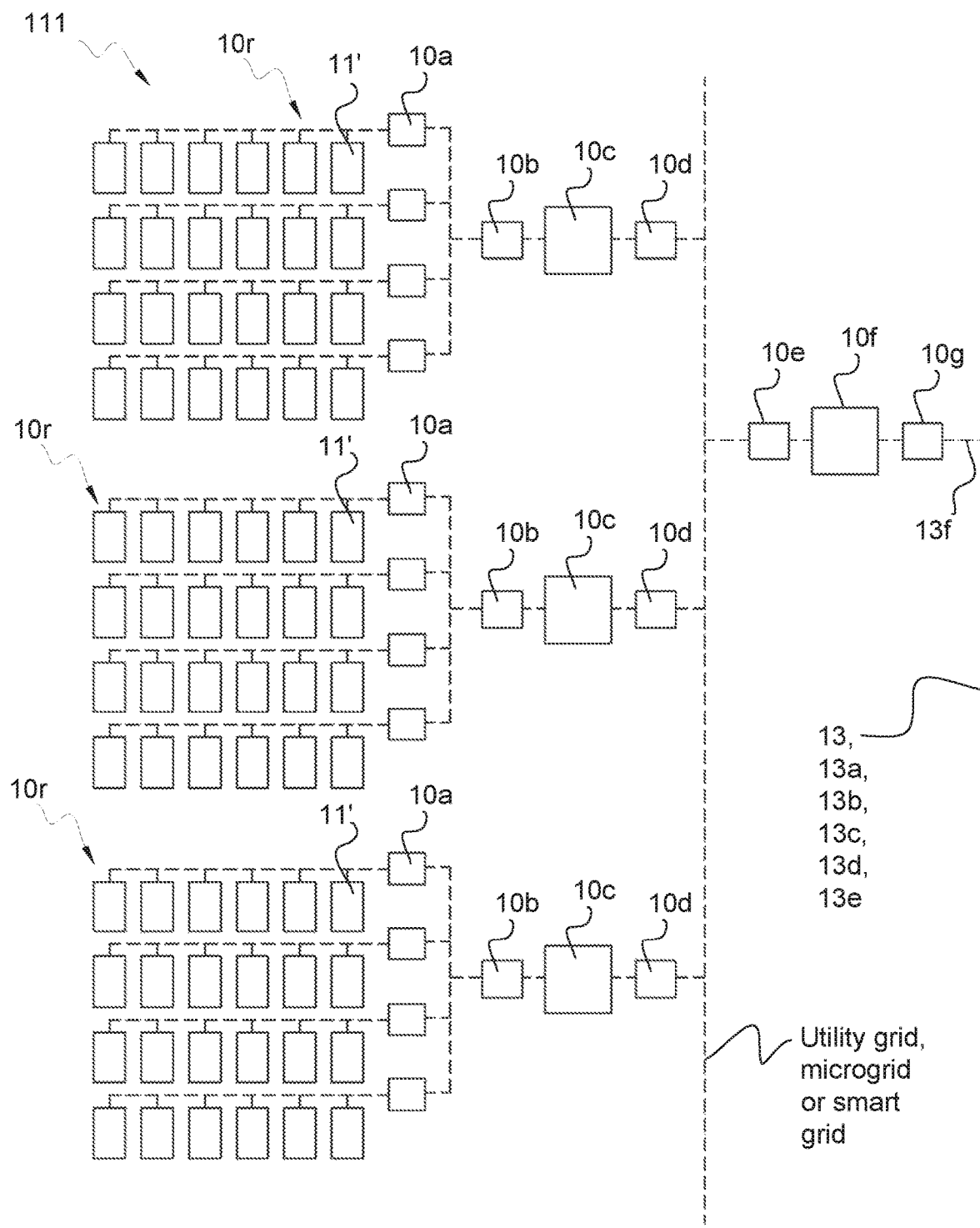
FIG. 11: Schematic diagram of one embodiment of the invention

FIG. 11 discloses an exemplary schematic of grid-tied IEGS system 111 showing how plurality of solar panels 11' can be electrically connected to electric transmission line(s) 13, 13a, 13b, 13c, 13d, 13e to directly power electric vehicles as shown in various embodiments of the present invention (FIGS. 4a, 4b, 5a, 5b, 6, 7a, 7b, 13, 14), and to supply power to electric vehicle charging stations 90 (FIG. 9). System 111 is similar to system 110 as described above with the exception that the electricity produced by solar panels 11' is first transmitted to utility grid, microgrid, or smart grid. From the utility grid, microgrid, or smart grid electricity is transmitted to electric transmission line(s) 13, 13a, 13b, 13c, 13d, 13e. The description of system 110 is generally applicable to system 111, hence it is not repeated here.

Figure 12:
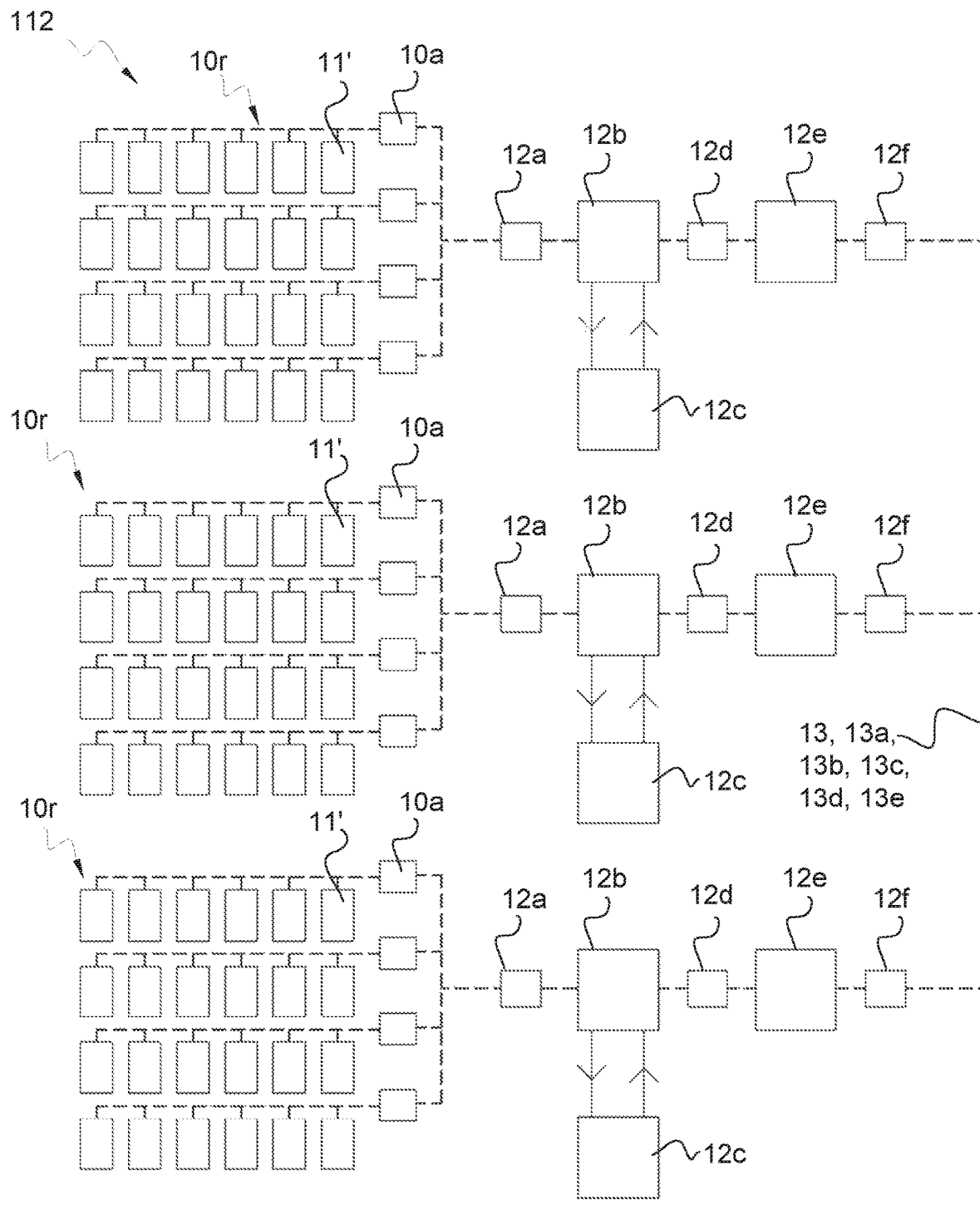
FIG. 12: Schematic diagram of one embodiment of the invention

FIG. 12 discloses an exemplary schematic of off-grid IEGS system 112 showing how plurality of solar panels 11' can be electrically connected to electric transmission line(s) 13, 13a, 13b, 13c, 13d, 13e to directly power electric vehicles as shown in various embodiments of the present invention (FIGS. 4a, 4b, 5a, 5b, 6, 7a, 7b, 13, 14), and to supply power to electric vehicle charging stations 90 (FIG. 9). In this embodiment the electricity produced by solar panels 11' is conditioned for transmission by using a number of electrical and electronic devices. Solar panels 11' are electrically connected via combiner boxes 10a to form solar arrays 10r. Each solar array 10r is connected to a DC disconnect switch 12a which is connected to a charge controller 12b. Charge controller is connected to backup battery 12c and to DC breaker panel 12d. DC breaker panel 12d is connected to inverter 12e which is connected to AC disconnect switch 12f. Charge controller 12b directs the flow of electricity from solar panels 11' to electric supply lines 13, 13a, 13b, 13c, 13d, 13e. When solar power is available it supplied to electric supply lines 13, 13a, 13b, 13c, 13d, 13e, and supplemental solar power is stored in battery 12c. When solar power is not available charge controller 12b directs the flow of electricity from battery 12c to electric supply lines 13, 13a, 13b, 13c, 13d, 13e. Off-grid IEGS system 112 may be more expensive than grid-tied systems 110 and 111, however where a utility grid is not available system 112 can fill in the gaps to maintain continuity within infrastructure energy generation systems disclosed herein. Other variations of IEGS system 112 are possible, and are within the scope of the present invention. For example the electricity produced by solar panels 11' can be tied to electric vehicle charging stations 90 and other DC powered devices within service area 95 (FIG. 9). In this case there would be no need to convert DC electricity to AC, hence inverter 12e and AC disconnect switch 12f can be omitted. This will allow to create off-grid service areas 95 along remote transportation routes where electricity from a utility grid is not available. In another embodiment of the present invention the electricity produced by solar panels 11' can be tied to DC transmission lines which may connect to high voltage DC (HVDC) grid. The above descriptions of IEGS systems 110, 111, 112 are exemplary and schematic; several other electric devices such as converters, transformers and switchgear will be required to ensure the safety of IEGS systems. An electrical engineer must be consulted to ensure the safety of IEGS systems.

Figure 13:
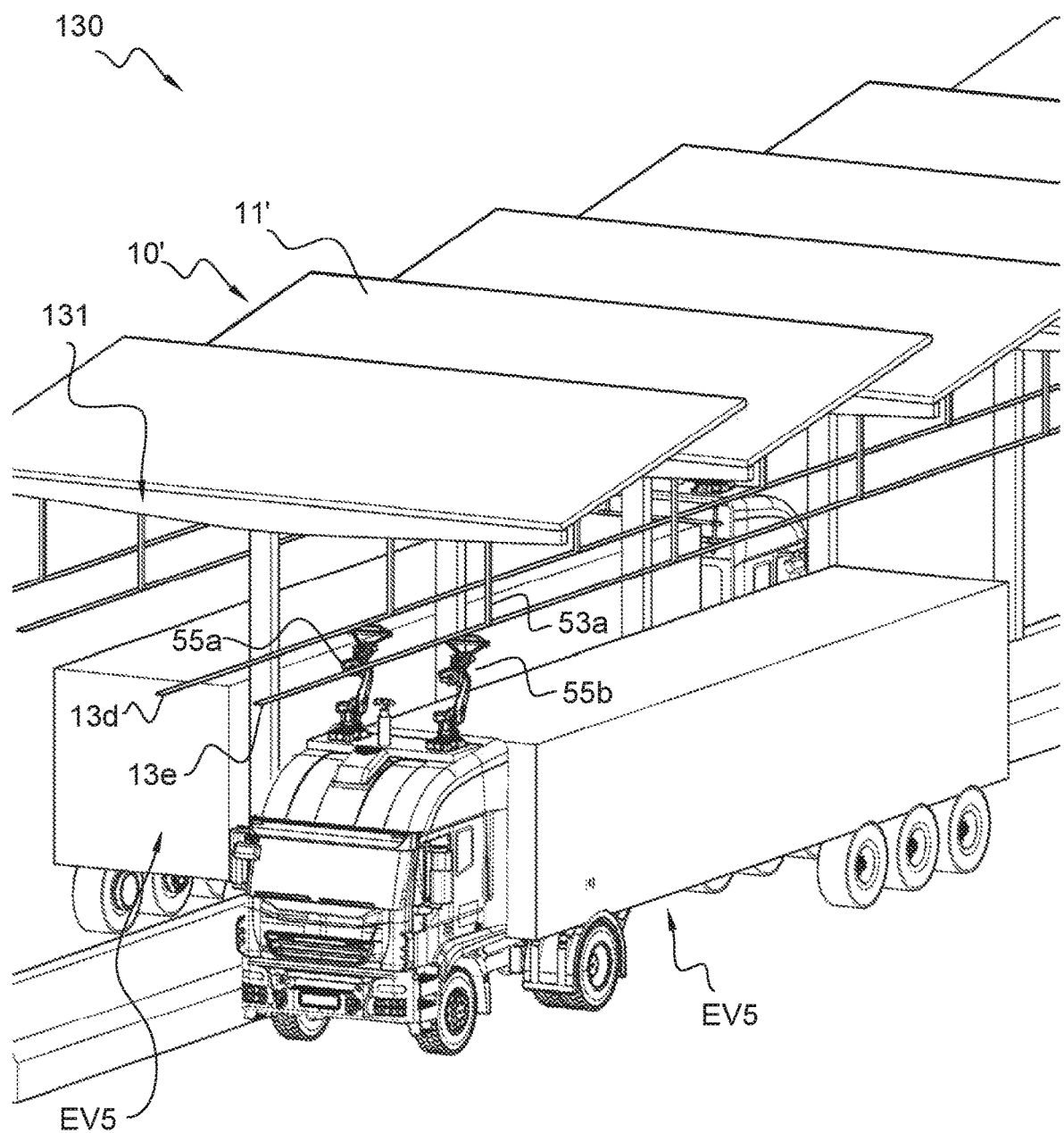
FIG. 13: 3D view of one embodiment of the invention

FIG. 13 discloses an embodiment of the present invention in accordance with infrastructure energy generation system 130. System 130 is similar to system 500 as disclosed hereinbefore. System 130 enables electric road vehicles such as trucks EV5 to be powered by solar energy. solar panels 11' forming plurality of solar arrays (photovoltaic structures) 10 are installed in the form of canopies 131 at a predetermined inclination for maximum solar gain. Electric supply lines 13d, 13e receive electricity produced by solar panels 11'. Electric supply lines 13d, 13e are suspended from canopy structure 50 by using droppers 53a. Electric supply lines 13d, 13e are backed by a microgrid, a utility grid, a smart grid or a battery as described under systems 110, 111, 112 hereinbefore. One of the electric supply lines 13d, 13d acts as phase line and the other acts a neutral when using AC current; similarly they act as positive (+) and a negative (−) when using DC current. Electric vehicles EV5 are equipped with pantograph assemblies 55a, 55b that enable EV5 vehicles to draw power from electric supply lines 13d, 13e while driven. System 130 enables electric road vehicles EV5 to be powered as well as charged using direct electrical power while driven hence extending their driving range.

Figure 14:
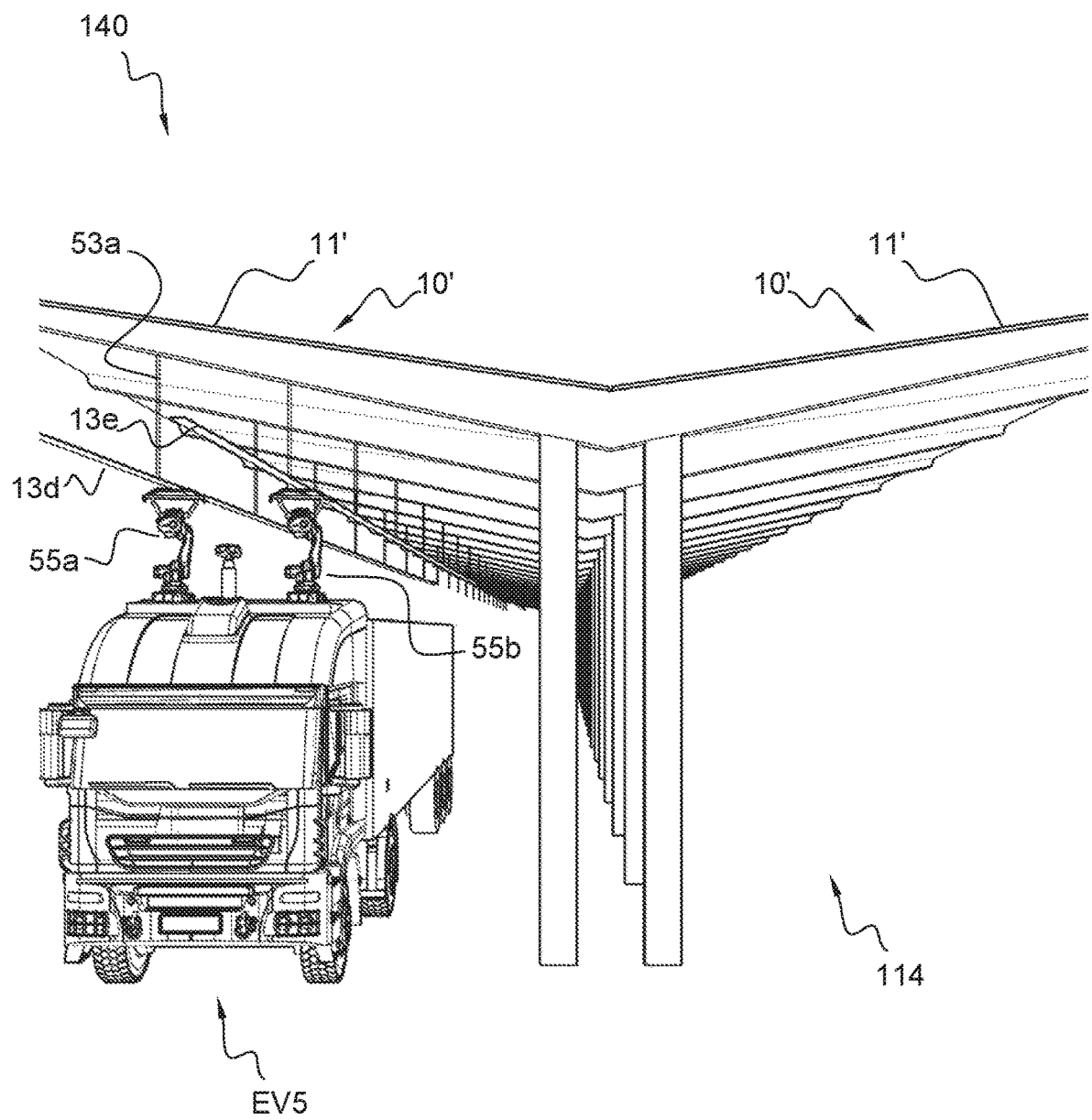
FIG. 14: 3D view of one embodiment of the invention

FIG. 14 discloses an embodiment of the present invention in accordance with infrastructure energy generation system 140. System 140 is similar to system 130 as disclosed hereinbefore. System 140 enables electric road vehicles such as trucks EV5 to be powered by solar energy. solar panels 11' forming plurality of solar arrays (photovoltaic structures) 10 are installed in the form of canopy 114. Electric supply lines 13d, 13e receive electricity produced by solar panels 11'. Electric supply lines 13d, 13e are suspended from canopy structure 114 by using droppers 53a. Electric supply lines 13d, 13e are backed by a microgrid, a utility grid, a smart grid or a battery as described under systems 110, 111, 112 hereinbefore. One of the electric supply lines 13*d*, 13*d* acts as phase line and the other acts a neutral when using AC current; similarly they act as positive (+) and a negative (−) when using DC current. Electric vehicle EV5 is equipped with pantograph assemblies 55*a*, 55*b* that enables it to draw power from electric supply lines 13*d*, 13*e* while driven. System 140 enables electric road vehicle EV5 to be powered as well as charged using direct electrical power while driven hence extending its driving range. Different other canopy configurations can be developed. For example an inverted 'L' shaped canopy can be designed for installation along shoulders of highways. All such configurations are within the scope of the present invention.

Figure 15:
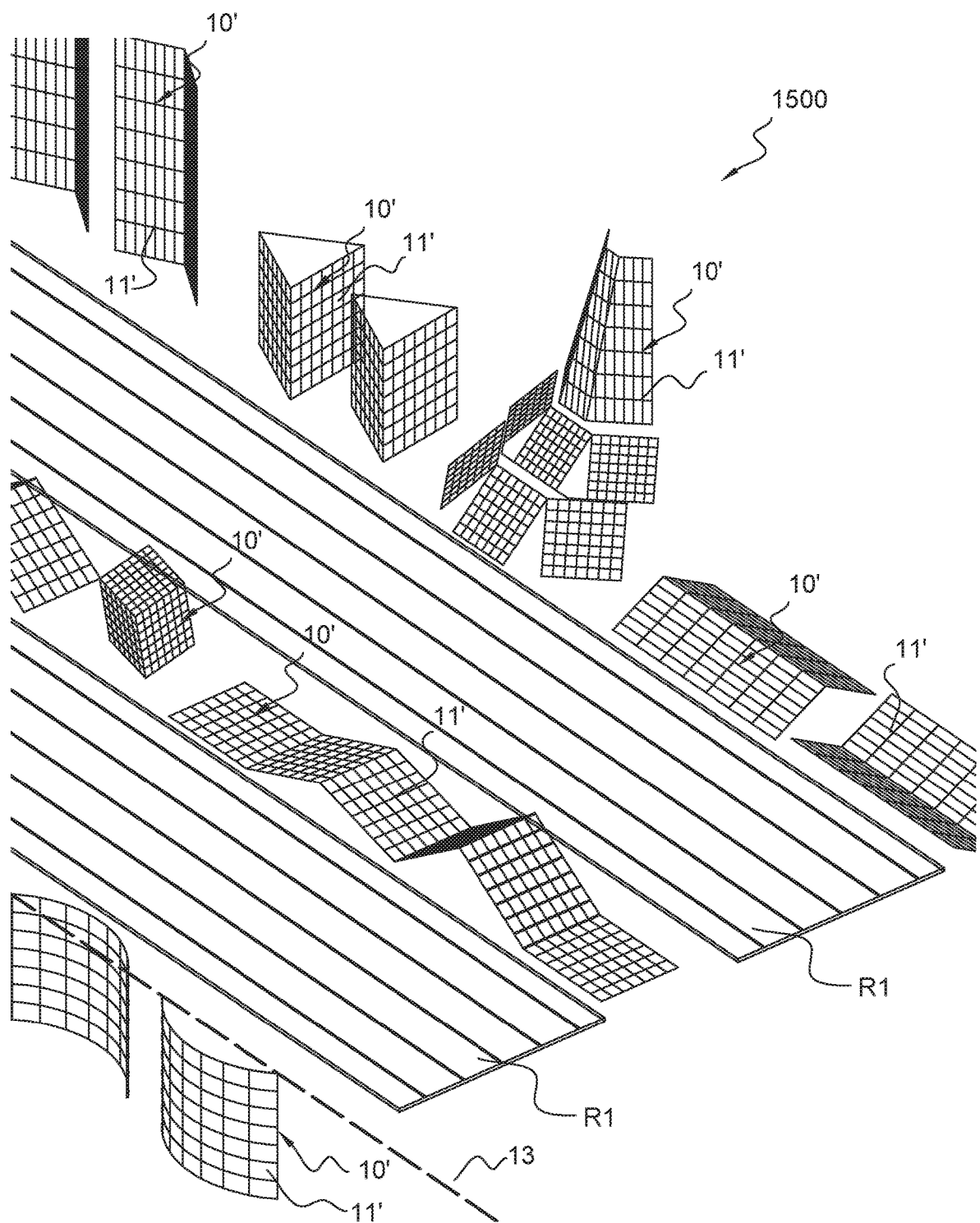
FIG. 15: 3D view of one embodiment of the invention

FIG. 15 discloses an embodiment of the present invention in accordance with infrastructure energy generation system 1500. System 1500 is comprised of a plurality of photovoltaic structures 10' installed along roads R1. Photovoltaic structures 10' are comprised of plurality of solar panels 11' arranged in predetermined geometric formations and shapes such as cubes, folded plates, prisms, inclined planes and curvilinear surfaces. It is an object of this embodiment of the invention to create interesting sculpture-like shapes along roads. The geometrical photovoltaic sculptures (structures) 10' as disclosed in FIG. 15 are exemplary; various other such shapes can be developed by combining various geometric surfaces and shapes such as squares, rectangles, triangles, cubes, prisms, pyramids, cylindrical shapes and curvilinear surfaces which can be arranged in predetermined orientations. All such variations are within the scope of the present invention. The objective of the present invention is to maximize solar exposure for solar panels while creating interesting views alongside roads. Photovoltaic thin films can be used to form sculpture-like shapes having complex curves and geometrical shapes. The electricity produced by solar panels 11' is transmitted to electric transmission line 13 which is used to facilitate solar powered transportation systems as described hereinbefore under systems 110, 111, 112.

Figure 16A:
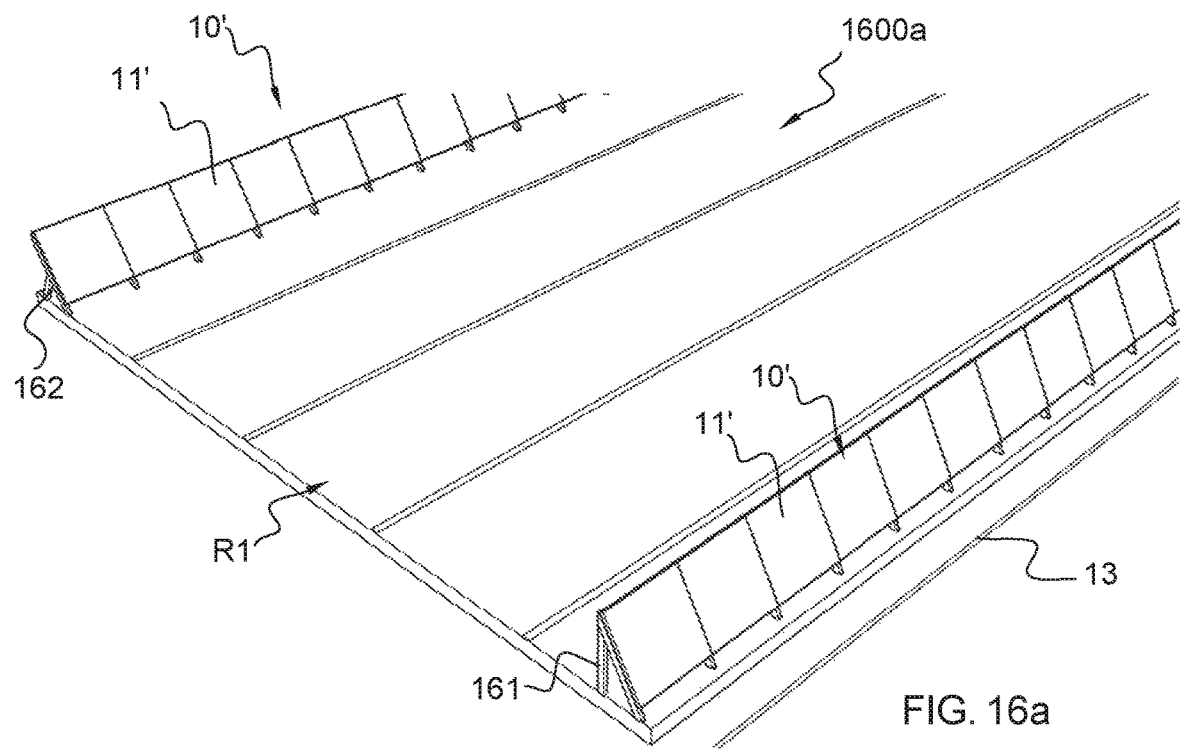
FIG. 16a: 3D view of one embodiment of the invention
FIG. 16b 3D view of one embodiment of the invention

FIG. 16*a* discloses an embodiment of the present invention in accordance with infrastructure energy generation system 1600*a*. System 1600*a* is comprised of a plurality of photovoltaic structures 10' installed along road R1. Photovoltaic structures 10' are comprised of plurality of solar panels 11' which are supported by vehicle barrier structures 161, 162. The shape of vehicle barrier structure as shown is exemplary, other similar shapes can be developed that can act as traffic barriers (vehicle impact barriers) as well as provide support systems for the solar panels. All such shapes are within the scope of the present invention. It is an objective of the present invention is to integrate solar panels into the vehicle impact barriers such that they not only act as traffic barriers or safety barriers but also generate electricity. Solar panels 11' are preferably covered with a transparent breakage resistant cover or coating. Electricity produced by solar panels 11' is supplied to electric transmission line 13 which can be connected to an off-grid or grid-tied electrical system as described hereinbefore under systems 110, 111, 112.

Figure 16B:
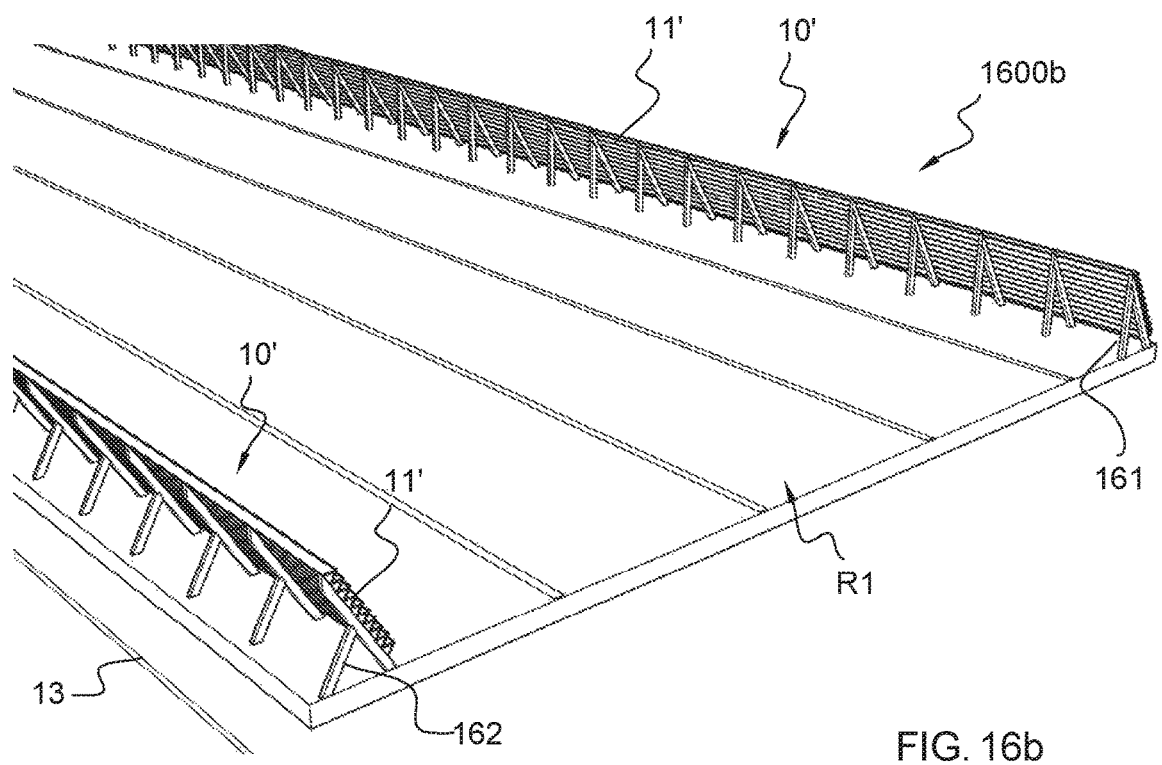

FIG. 16*b* discloses an embodiment of the present invention in accordance with infrastructure energy generation system 1600*b*. System 1600*b* is comprised of a plurality of photovoltaic structures 10' installed along road R1. Photovoltaic structures 10' are comprised of plurality of solar panels 11' which are supported by vehicle impact barriers structures 161, 162. Solar panels 11' can be solar thin film having a corrugated profile as shown or they can be conventional solar panels. Solar panels 11' are preferably covered with a transparent breakage resistant cover or coating. The shape of vehicle impact barrier structures as shown is exemplary, other similar shapes can be used to act as traffic barriers as well as provide support for solar panels 11'. All such shapes are within the scope of the present invention. It is an objective of the present invention is to integrate solar panels into vehicle impact barriers such that they not only act as traffic barriers or safety barriers but also generate electricity. Electricity produced by solar panels 11' is supplied to electric transmission line 13 which can be connected to an off-grid or grid-tied electrical system as described hereinbefore under systems 110, 111, 112.

Figure 17A:
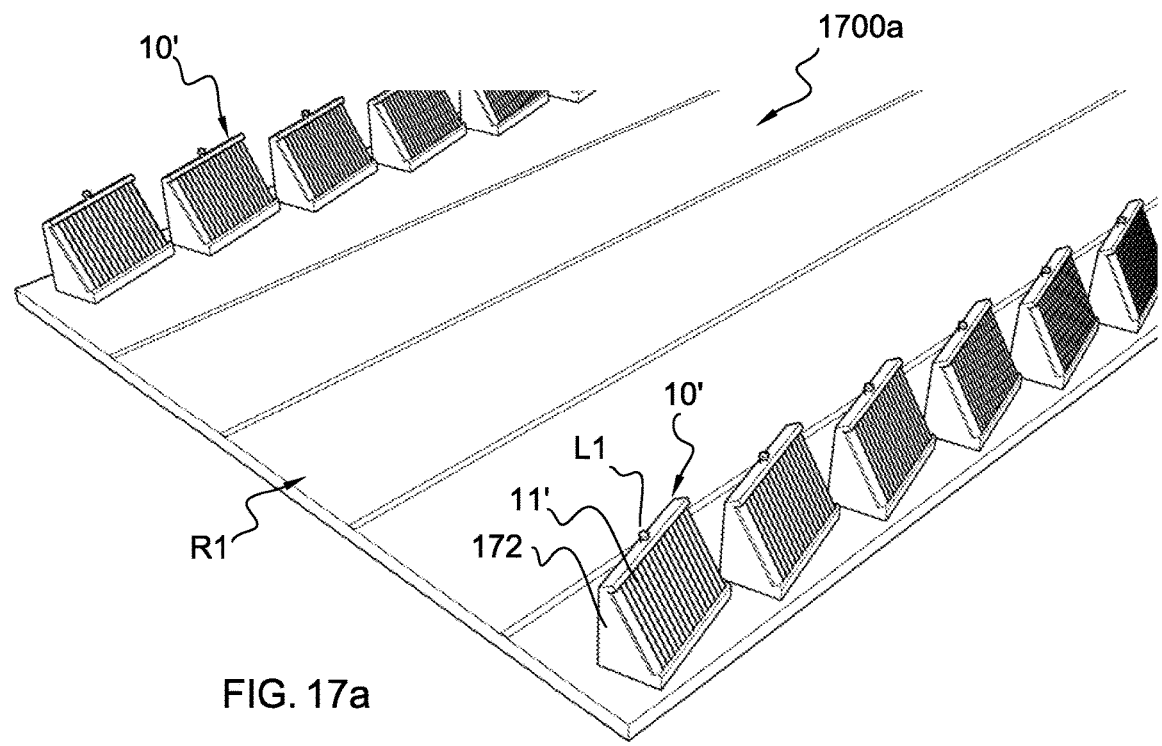
FIG. 17a: 3D view of one embodiment of the invention
FIG. 17b 3D view of one embodiment of the invention

FIG. 17*a* discloses an embodiment of the present invention in accordance with infrastructure energy generation system 1700*a*. System 1700*a* is comprised of a plurality of photovoltaic structures 10' installed along road R1. Photovoltaic structures 10' are comprised of thin film solar panels 11' which are supported by structural base 172. Structural base 172 can be a hollow shape made of precast concrete or plastic which can be attached to road R1. Or structural base 172 can be a self supporting portable module. Photovoltaic structures 10' shown on this embodiment can be manufactured units that can be readily assembled in the field. Structural bases 172 are intended to act a traffic barriers or vehicle impact barriers. Similar other shapes are withing the scope of the present inventions. Photovoltaic structures 10' can be oriented in the horizontal plane in predetermined directions along road R1 to maximize solar gain for solar panels 11'. Photovoltaic structures 10' are equipped with lights L1 that can provide illumination and/or act as guiding lights for drivers. Electricity produced by solar panels 11' can be stored into a backup battery to power lights L1 during night.

Figure 17B:
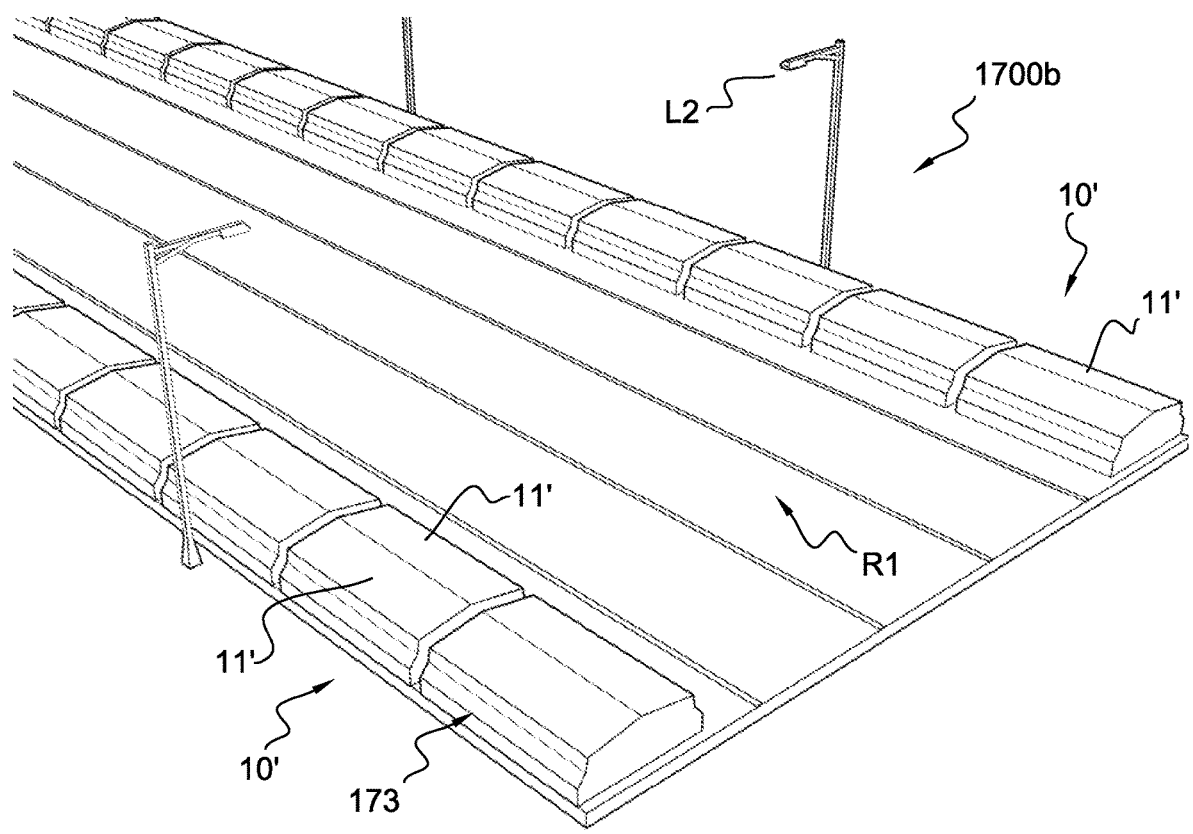

FIG. 17*b* discloses an embodiment of the present invention in accordance with infrastructure energy generation system 1700*b*. System 1700*b* is comprised of a plurality of photovoltaic structures 10' installed along road R1. Photovoltaic structures 10' in this embodiment are integrated photovoltaic traffic barriers in which solar panels 11' are integrated into the vehicle impact barriers. Photovoltaic structures 10' are comprised of solar panels 11' and structural base 173. The profiles of sides of structural base 173 facing road R1 closely resemble the jersey barriers approved by the Federal Highway Administration (FHWA), National Highway Traffic Safety Administration (NHTSA) and/or Department of Transportation of various jurisdictions. The side walls of structural base 173 facing roadway have predetermined profiles to act as vehicle impact barriers meeting the requirements of the aforementioned agencies. The side walls of said photovoltaic structures are made of rigid material such as concrete or plastic having predetermined thickness to withstand vehicular impacts. Photovoltaic structures 10' are structurally sound to withstand wind loads, traffic vibrations and predetermined structural stresses for stability. Structural base 173 is preferably hollow inside, and is comprised of means such as bolt attachments to secure it to the ground. Structural bases 173 can be made of concrete or plastic and can be attached to road R1 using structural connections (not shown). Or they can portable units that can be self supporting. Solar panels 11' span in between side walls to form enclosed photovoltaic structure 10'. Solar panels 11' are preferably supported by structural frames (not shown) underneath. Photovoltaic structures 10' shown in this embodiment can be manufactured units that can be readily assembled in the field. In this embodiment of the invention photovoltaic structures 10' can be referred to as integrated photovoltaic barriers which not only produce electricity but also act as vehicle impact barriers or traffic barriers. Similarly other shapes of photovoltaic structures 10' such as prismatic shapes, cuboids, and truncated geometrical shapes are within the scope of the present invention. Photovoltaic structures 10' can be oriented and arranged along road R1 in predetermined patterns to maximize solar gain for solar panels 11'. Solar panels 11' are electrically connected to a backup battery and timer to power roadway lights L2 during night. Solar panels 11' can also be connected to a grid-tied electrical system or a be part of a distributed energy resource (DER).

Figure 18:
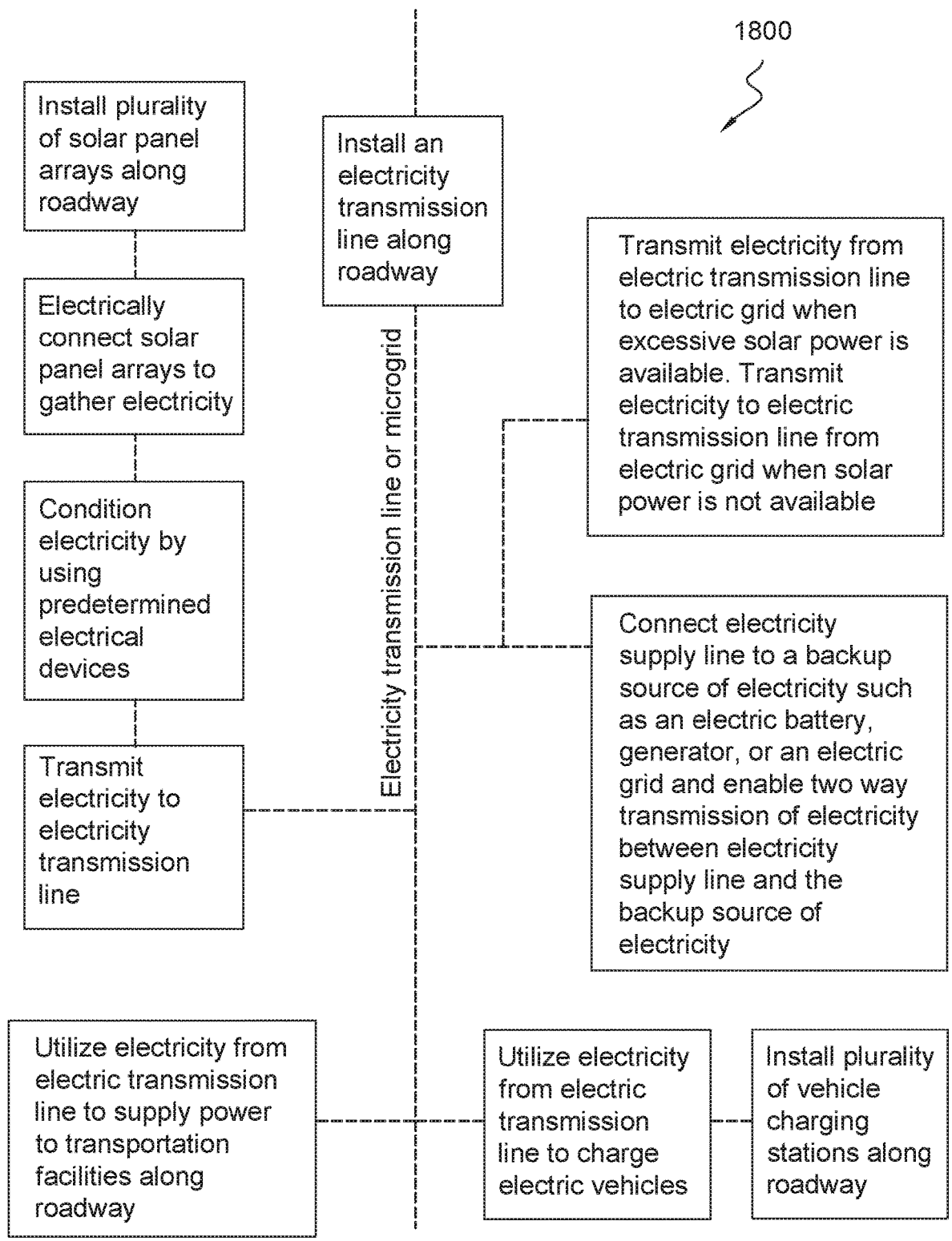
FIG. 18: Schematic diagram of one embodiment of the invention

FIG. 18 discloses a schematic outlining method 1800 in accordance with one embodiment of the present invention. Method 1800 enables to charge electric vehicles along roads and highways to facilitate the implementation of one or more infrastructure energy generation system (IEGS) disclosed hereinbefore. To enable solar powered transportation along long routes requires several steps as depicted in FIG. 18. The travel range of electric vehicles is limited; it requires installing electric vehicle charging stations along the transportation route. Method 1800 discloses how these charging stations can utilize electricity produced by solar arrays installed along the transportation route. Transportation facilities such as rest areas along the transportation route, street lights, illuminated signs etc. can all be powered with solar energy. Supplemental electricity produced by solar arrays can be transmitted to the electric grid that can be used for other purposes. The following are exemplary steps of method 1800 to facilitate infrastructure energy generation system. A predetermined order of these steps can be developed to facilitate a IEGS. Other similar methods can be developed based on this exemplary method which are within the scope of the present invention:

Install plurality of solar panel arrays along a road;
Electrically connect the solar panel arrays to gather electricity;
Condition electricity produced by solar arrays by using predetermined electrical devices;
Install an electricity transmission line along the road;
Transmit electricity produced by solar arrays to the electricity transmission line;
Connect the electricity supply line to a backup source of electricity such as an electric battery, generator(s), wind turbines, fuel cell or an electric grid and enable two way transmission of electricity between the electricity supply line and the backup source of electricity;
Transmit electricity from the electric transmission line to the electric grid when excessive solar power is available. Transmit electricity to the electric transmission line from the electric grid when solar power is not available;
Install plurality of electric vehicle charging stations along the road;
Utilize electricity from the electric transmission line to charge electric vehicles;
Utilize electricity from the electric transmission line to supply power to transportation facilities along road.
Configure method 1800 as a Distributed Energy Resource (DER) or a microgrid, and manage the flow of electricity by using a Distributed Energy Resource Management System (DERMS).

Figure 19:
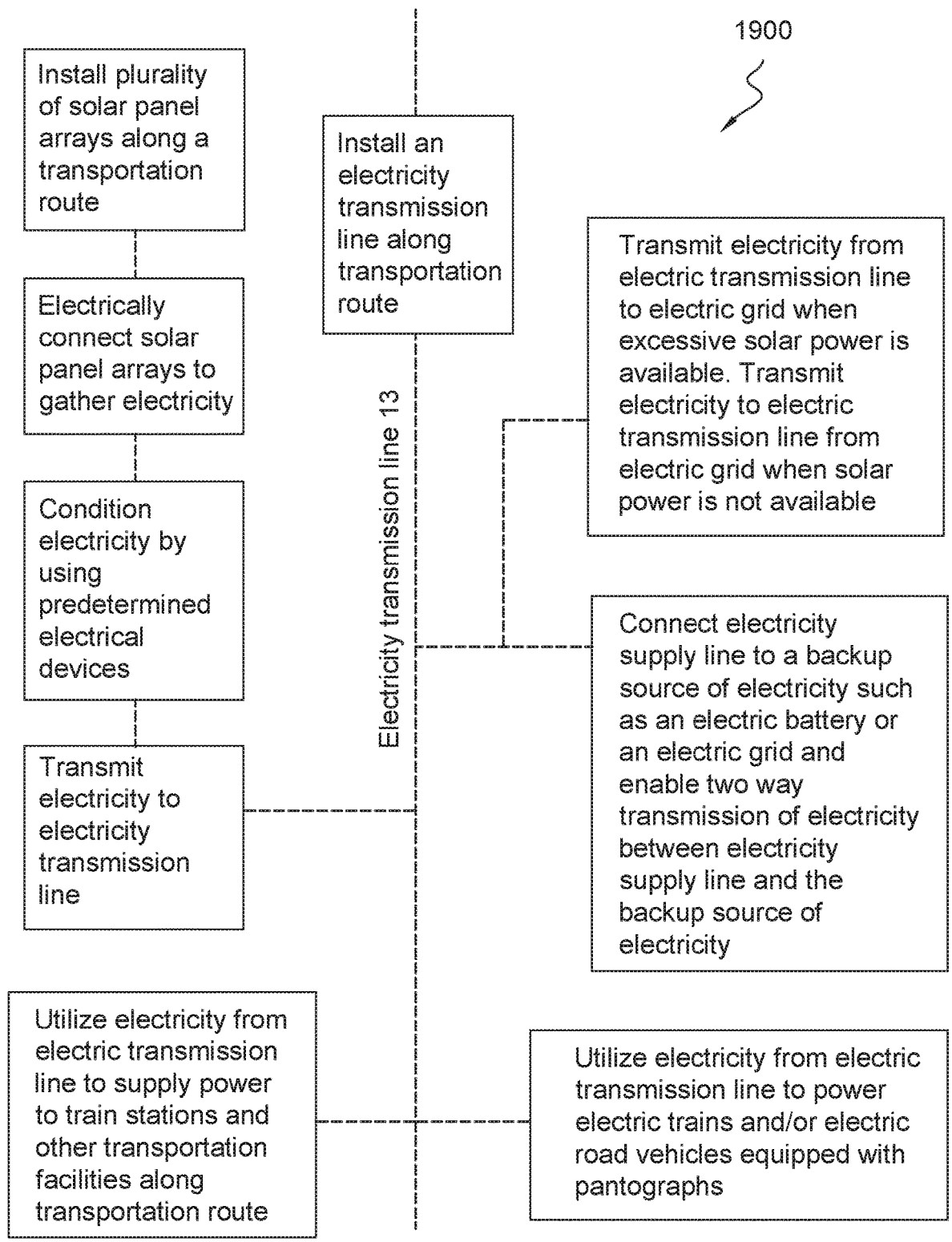
FIG. 19: Schematic diagram of one embodiment of the invention

FIG. 19 discloses a schematic outlining method 1900 in accordance with one embodiment of the present invention. Method 1900 enables to power electric trains and electric road vehicles to be substantially powered with solar energy by using one or more IEGS systems disclosed hereinbefore. For example train tracks and a highway can run parallel with each other to develop a multi-system transportation route. The following are some of the exemplary steps of method 1900 to facilitate solar powered transportation; other similar methods are within the scope of the present invention:

Install plurality of solar panel arrays along a road;
Electrically connect the solar panel arrays to gather electricity;
Condition electricity produced by solar arrays by using predetermined electrical devices;
Install an electricity transmission line along the road;
Transmit electricity produced by solar arrays to the electricity transmission line;
Connect the electricity supply line to a backup source of electricity such as an electric battery or an electric grid and enable two way transmission of electricity between the electricity supply line and the backup source of electricity;
Transmit electricity from the electric transmission line to the electric grid when excessive solar power is available. Transmit electricity to the electric transmission line from the electric grid when solar power is not available;
Install plurality of electric vehicle charging stations along the road;
Utilize electricity from the electric transmission line to charge electric vehicles;
Utilize electricity from the electric transmission line to supply power to transportation facilities along road.
The steps listed above can be performed in a predetermined order to meet the requirements of infrastructure energy generation systems (IEGSs) disclosed herein.

Figure 20A:
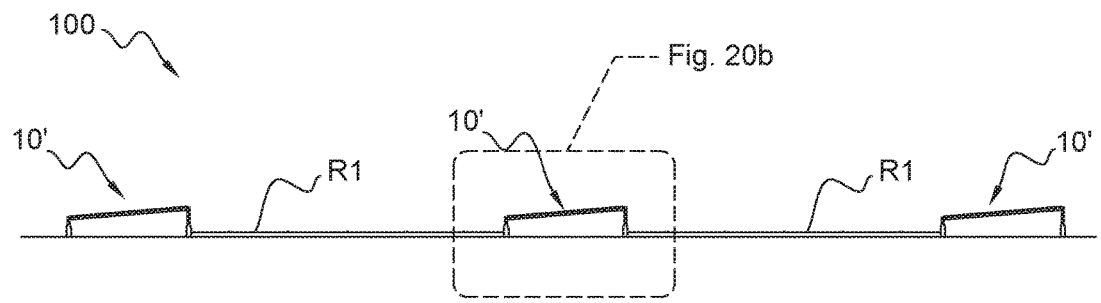
FIG. 20a: Sectional view of one embodiment of the invention
Figure 20B:
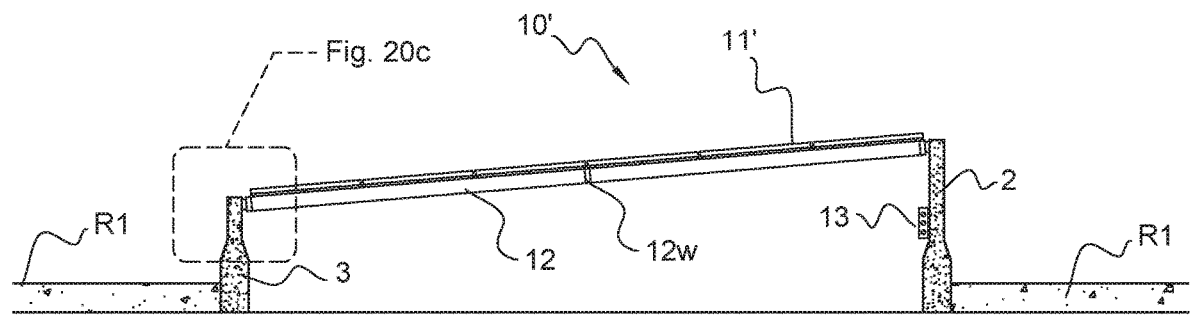
FIG. 20b: Sectional view of one embodiment of the invention
Figure 20C:
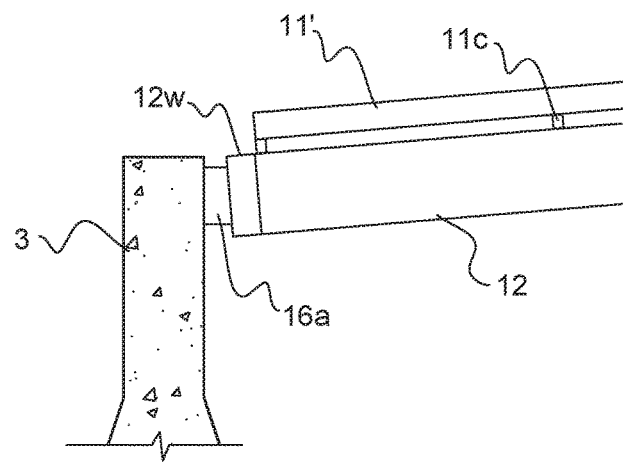
FIG. 20c: Sectional view of one embodiment of the invention
Figure 21A:
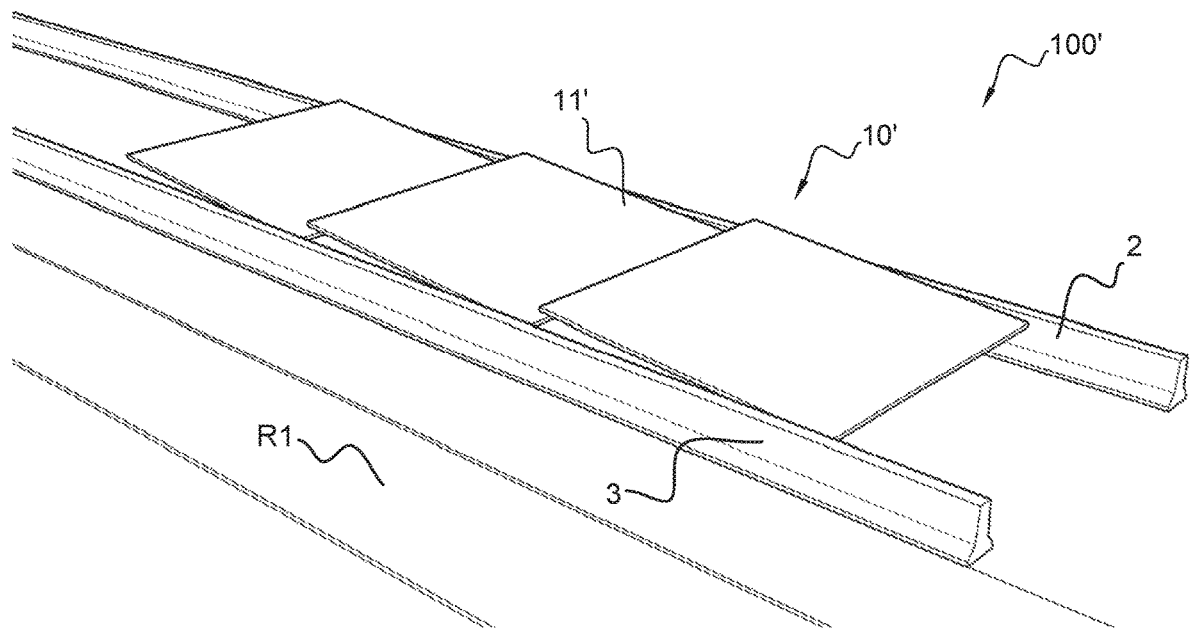
FIG. 21a: 3D view of one embodiment of the invention
FIG. 21b 3D view of one embodiment of the invention
Figure 21B:
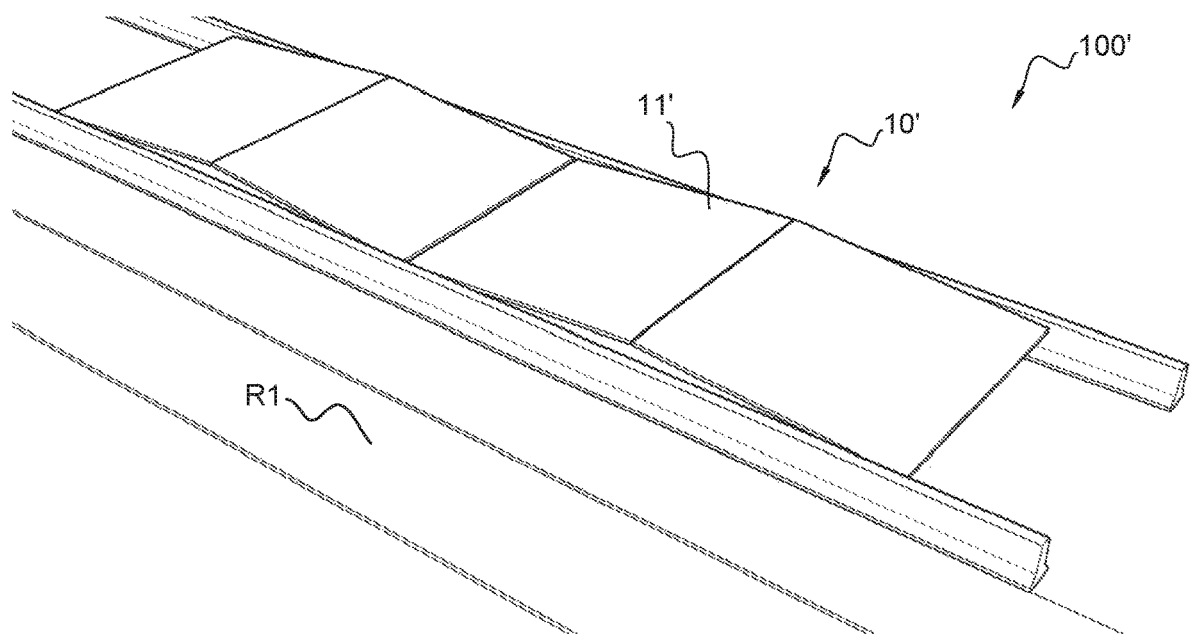

FIGS. 21a, 21b disclose a variation of infrastructure energy generation system (IEGS) 100 (100') as described and illustrated in FIGS. 1, 20a, 20b, 20c hereinbefore. FIG. 21a illustrates how photovoltaic structures 10' comprising solar panels 1' can be inclined in the vertical plane from the linear axis of vehicle impact barriers 2,3. This configuration can be suitable for roads running in the N-S direction to maximize solar gain for solar panels 11'. Similarly solar panels 1' can be oriented at an angle in the horizontal plane to maximize solar gain for roads running in different directions. FIG. 21b illustrates an example of photovoltaic structures 10' forming ridges and valleys of solar panels 11' to maximize solar gain based on other directions of roads R1.

Figure 22A:
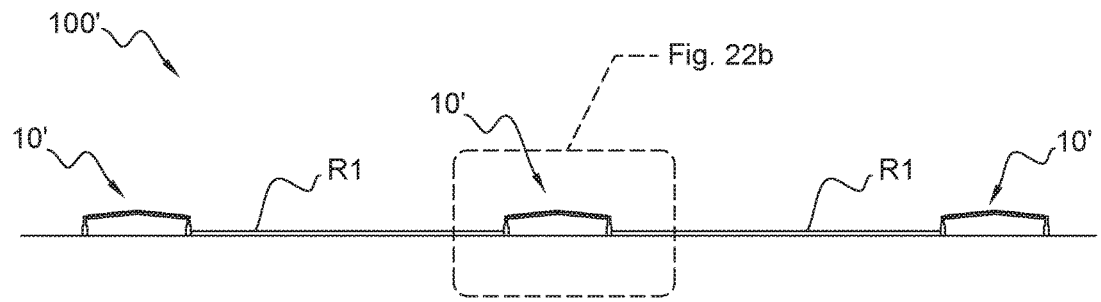
FIG. 22a: Sectional view of one embodiment of the invention
Figure 22B:
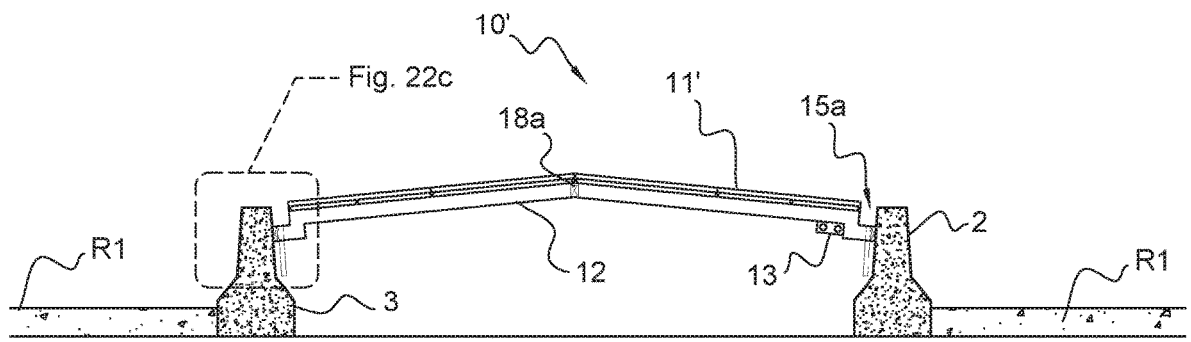
FIG. 22b: Sectional view of one embodiment of the invention
Figure 22C:
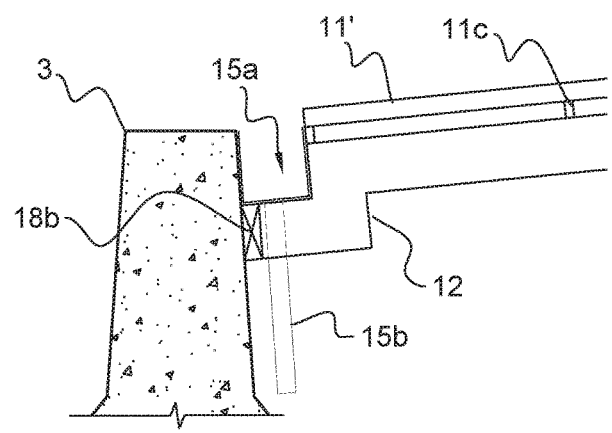
FIG. 22c: Sectional view of one embodiment of the invention

FIGS. 22a, 22b, 22c disclose a variation of infrastructure energy generation system (IEGS) 100 (100') which is similar to as described and illustrated in FIGS. 1, 20a, 20b, 20c, 21a, 21b hereinbefore. FIG. 22a discloses a cross section through roadways R1. FIG. 22b shows enlargement of photovoltaic structure 10'; FIG. 22c shows enlargement of one corner or photovoltaic structure 10'. Photovoltaic structure 10' is comprised of concrete vehicle impact barriers 2, 3; plurality of structural frames 12 spanning in between vehicle impact barriers 2 and 3, and structurally attached to them. Structural frames 12 form a ridge at the top and valley at the ends to form a predetermined slope for water drainage, and solar exposure for solar panels 11'. Continuous horizontal cross bracing members 18a, 18b structurally connect structural frames 12 at predetermined intervals. Plurality of solar panels 11' are attached to structural frames 12 with the help of plurality of runners 11c. Gutters 15a are attached the lower end of structural frames 12 to collect rain water and drain it through drains 15b. The rain water can also be collected in water storage tanks later use which can be beneficial for drought prone regions. Transmission lines 13 can be attached to structural frames 12 under the weather protection of solar panels 11'.

Figure 23A:
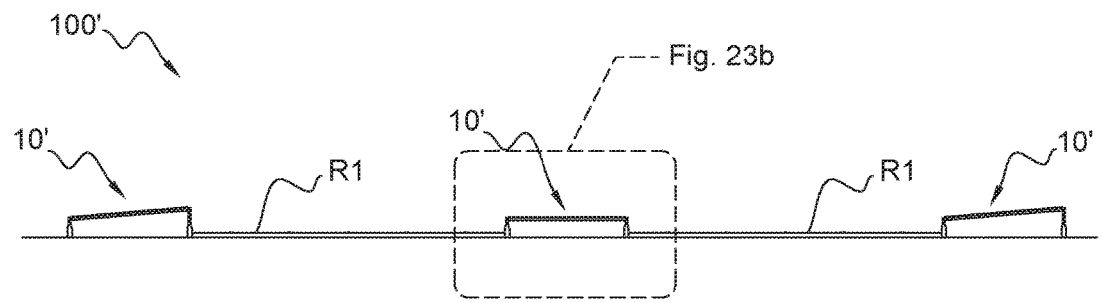
FIG. 23a: Sectional view of one embodiment of the invention
Figure 23B:
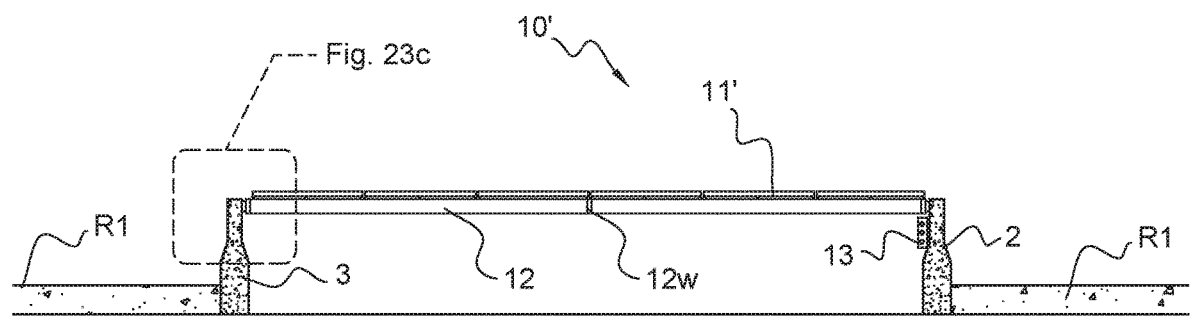
FIG. 23b: Sectional view of one embodiment of the invention
Figure 23C:
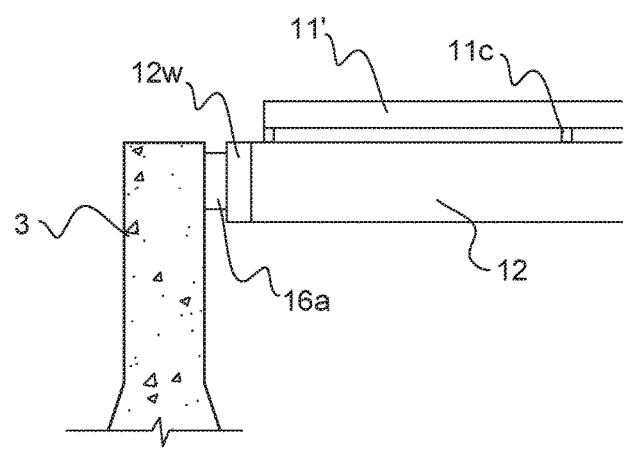
FIG. 23c: Sectional view of one embodiment of the invention

FIGS. 23a, 23b, 23c disclose a variation of infrastructure energy generation system (IEGS) 100 (100') which is similar to as described and illustrated in FIGS. 1, 20a, 20b, 20c, 21a, 21b, 22a, 22b, 22c hereinbefore. In this embodiment of the invention photovoltaic structures 10' comprising solar panels 1' are made have a flat top surface. This can enable solar gain from all directions. Predetermined minor slopes can be formed in the flat top surface to enable drainage of rain water as well as to achieve solar gains. Solar panels 11' are supported by structural frames 12 spanning between vehicle impact barriers 2 and 3 forming photovoltaic structures 10'. Structural frames 12 are preferably attached to vehicle impact barrier 2 and 3 by using structural isolation joints 16a to prevent damage to solar panels 11' in case there is a vehicular impact on barrier 2 or 3. Solar panels 11' are supported over runners 11c which are attached to structural frames 12. Structural frames 12 can be structural steel joists, c-channels or metallic tubes, or they can be made by welding steel sections/tubes together. Or they can be in the form of structural trusses. Structural steel frames 12 are joined together with cross bracing members 12w. The energy produced by solar panels 11' is supplied to electric transmission line 13.

Figure 24:
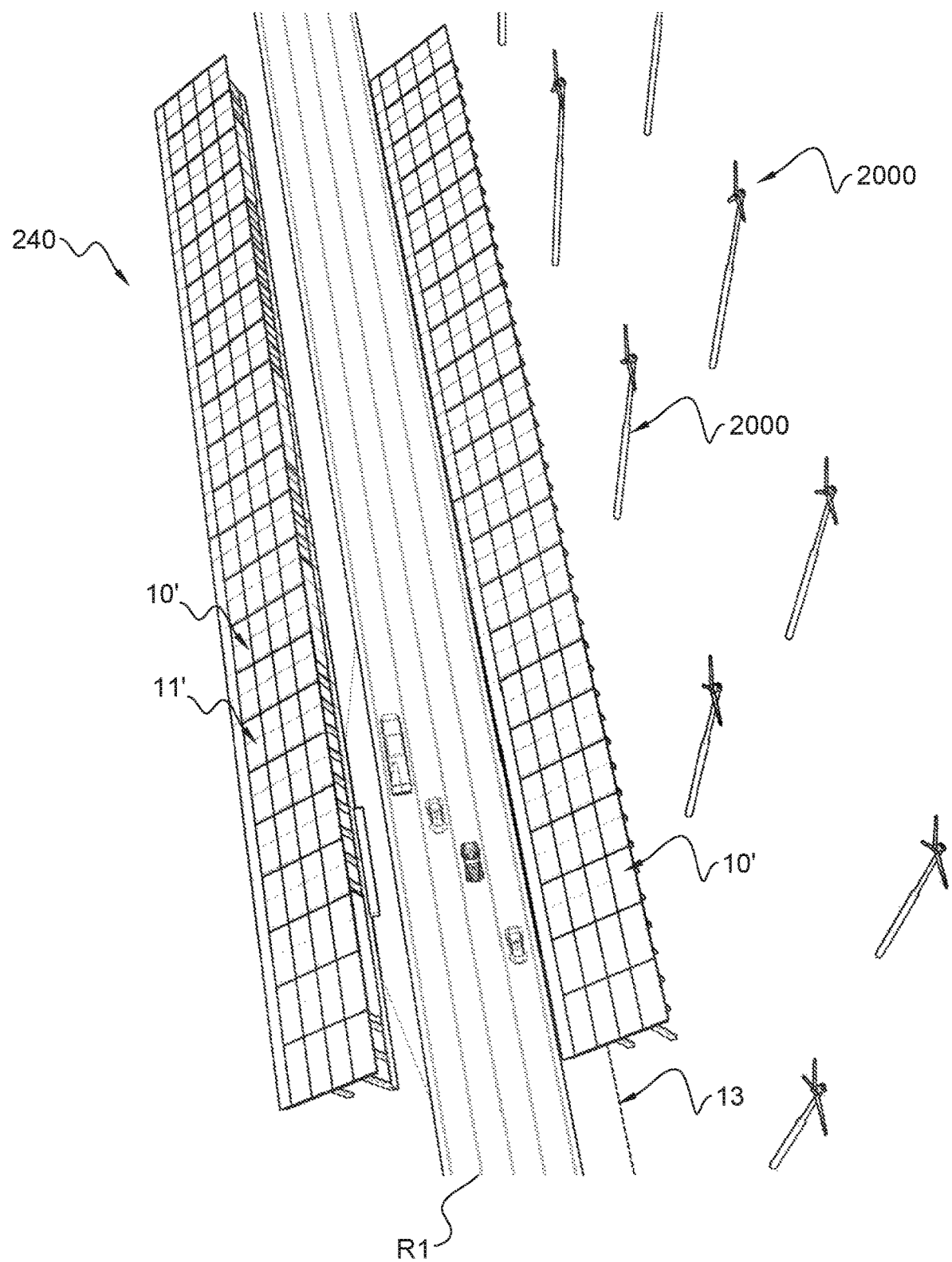
FIG. 24: 3D view of one embodiment of the invention

FIG. 24 discloses an embodiment of the present invention in accordance with infrastructure energy generation system 240. System 240 is comprised of a plurality of photovoltaic structures 10' and wind turbines 2000 installed along road R1. The electricity produced by photovoltaic structures 10' and wind turbines 2000 is transmitted by using transmission line 13.

Figure 25:
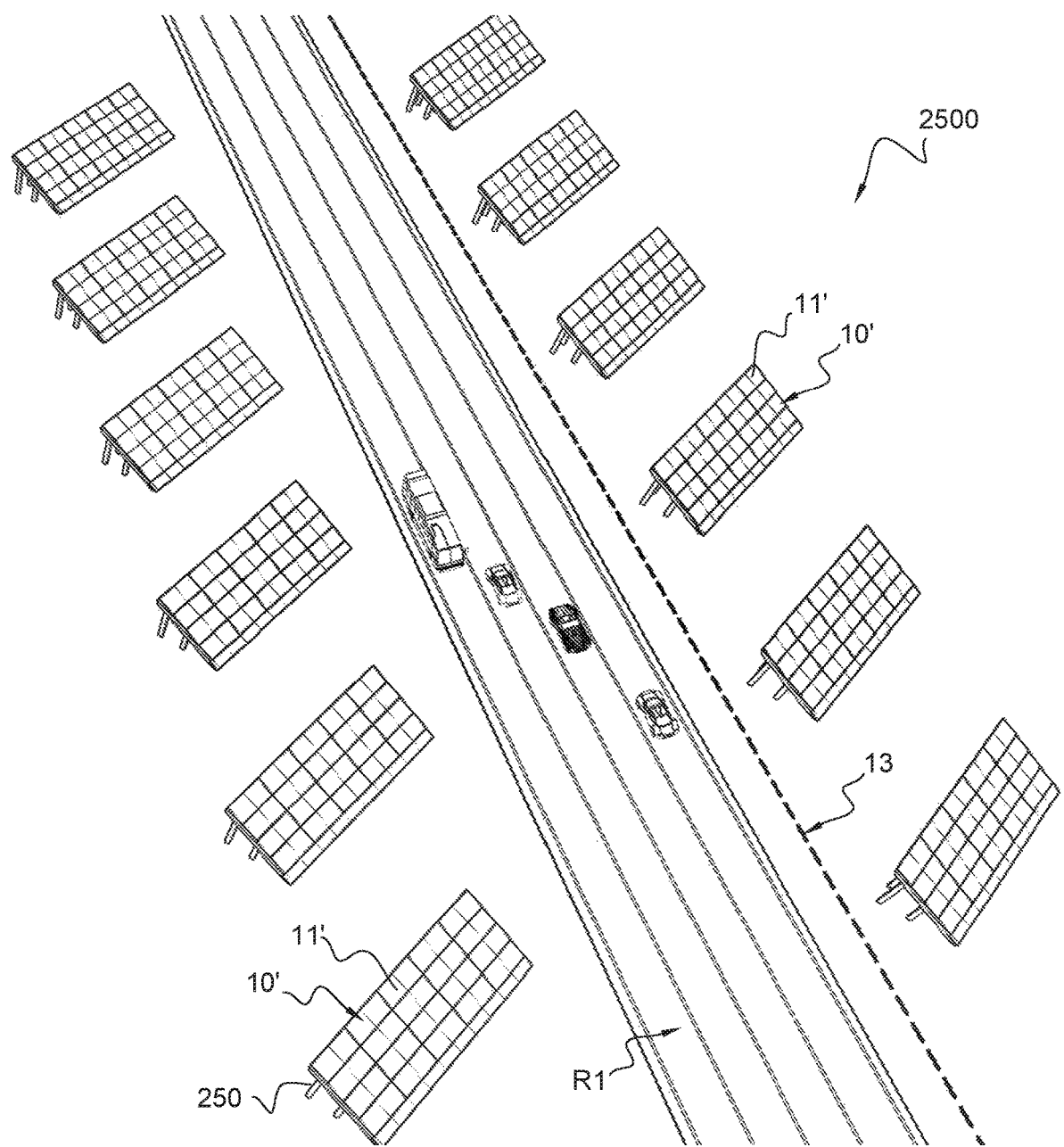
FIG. 25: 3D view of one embodiment of the invention

FIG. 25 discloses an embodiment of the present invention in accordance with infrastructure energy generation system 2500. Infrastructure energy generation system 2500 is comprised of photovoltaic structures 10' and electric transmission line 13 installed along road R1. Photovoltaic structures 10' are comprised of plurality of solar panels 11' supported by an inclined structural support system 250. Structural support system 250 is comprised of plurality of predetermined structural frames structurally jointed together to form a stable structure. Structural support system 250 enables to configure photovoltaic structures 10' as inclined photovoltaic barriers. Inclined photovoltaic barriers 10' can be permanently fixed to the ground with a foundation or they can be portable units which can supported on the ground with ballast. Inclined photovoltaic barriers (structures) 10' can be also be made adjustable to adjust the tilt angle of solar panels for maximum solar gain. Infrastructure energy generation system 2500 can be part of a distributed energy resource (DER) or microgrid system.

Figure 26:
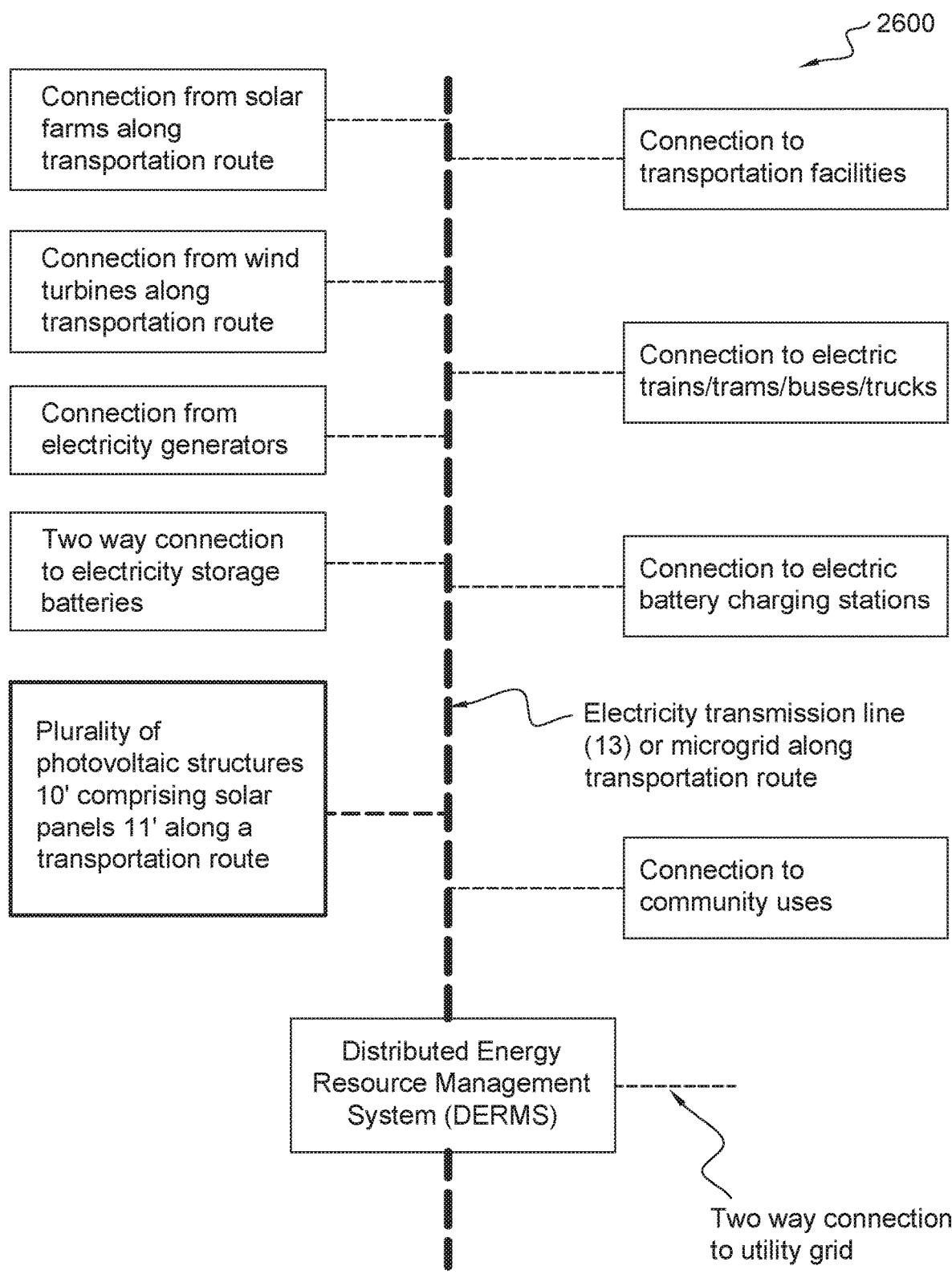
FIG. 26: Schematic diagram of one embodiment of the invention

FIG. 26 discloses an embodiment of the present invention in accordance with infrastructure energy generation system (IEGS) 2600. FIG. 26 schematically depicts plurality of photovoltaic structures 10' connected to electric transmission line 13 installed along a transportation route. Energy produced by photovoltaic structures 10' is supplied to transmission line 13 which supplies electricity to transportation facilities, electric trains, electric buses, electric trucks, electric battery charging facilities, and other community uses along the transportation route. Electric trains, electric buses and electric trucks can be configured to directly utilize this energy by using pantographs as described and illustrated hereinbefore. Additional sources of electricity production are connected to electric transmission line 13 to ensure electrical power when solar energy is not available. These additional sources can be solar farms along the transportation route, wind turbines along the transportation route, and electricity generators. Electric transmission line 13 is also connected to electric batteries which are used to store and distribute electricity. Electric transmission line 13 is also connected to a utility grid to utilize electricity from the utility grid when there is a need, and supply electricity to the utility grid when supplemental electricity is available. Electric transmission line 13 can be disconnected from the utility grid during predetermined events. The flow of electricity is managed between electric loads, energy generation sources and utility grid by Distributed Energy Resource Management System (DERMS) software. Infrastructure energy generation system (IEGS) 2600 can be configured as a distributed energy resource (DER), a microgrid or a smart grid system.

The embodiments of the present invention as described herein are for examples only; they should not be used in a limiting sense to interpret the scope of the present invention. Any modifications made to the assemblies, sub-assemblies and systems disclosed herein utilizing the means, methods, and principles of the present invention are within the scope of the present invention. Plurality of infrastructure energy generation systems (IEGSs) as disclosed herein can be combined to make a network of solar highways all across the United States, and elsewhere.

Infrastructure energy generation systems (IEGSs) as described and illustrated herein can enable net-zero transportation in which very little carbon emissions are produced. Pollution generating highways can be transformed into clean energy and revenue generating solar highways. Highways can be made even net-positive in which they can produce supplemental electricity to serve adjoining communities. Several industries can be developed along these solar highways to utilize electricity. For example crops packing and shipping facilities can be developed along highways to benefit farmers. Electric train and bus routes utilizing a combination of IEGSs can facilitate park-and-ride facilities along highways. Infrastructure energy generation systems (IEGSs) will pay for themselves overtime by the electricity produced by them. Travel and transportation can become cheaper as the electric vehicles are much more efficient than gasoline per mile traveled.

This specification includes several exemplary embodiments of photovoltaic structures 10' that can be used as part of the infrastructure energy systems disclosed herein. While each of these embodiments have their own merits, a greater focus of the present invention is on infrastructure energy generation systems 100, 100' and 1700b as illustrated in FIGS. 1, 17b, 20a, 20b, 20c, 21a, 21b, 22a, 22b, 22c, 23a, 23b and 23c. Some of the claims of the present invention are focused around these embodiments, however these embodiments can be configured to work with other infrastructure energy systems disclosed herein as well. For example the photovoltaic structures 10' as shown in the aforementioned FIGS. can be incorporated along train tracks CESS area similar to as shown in FIGS. 7a, 7b as part of system 700. The photovoltaic structures 10' as denoted in the above referenced figures generally represent solar panels 11' supported by a framing structure which is further supported by vehicle impact barriers (or traffic barrier) 2,3. The references 2, 3 are denoted in a generic sense to show similar or alike elements regardless of their shape, size and location. The term vehicle impact barriers is used in a generic sense; it is meant to represent traffic barriers, crash barriers, roadside barriers, median barriers, work zone barriers, area dividers, and the like.

Shoulders of roadway or CESS area along train tracks often remain wasted land. The novelty of the present invention is configuration of photovoltaic structures 10' to utilize these spaces for producing green energy and using that energy for supplying power to electric vehicles while also providing traffic safety, and other environmental benefits such as drainage water management and storm water management. Photovoltaic structures 10' as shown in the aforementioned FIGS. are configured to provide traffic safety in a number of ways. For example they protect the transportation route against intrusion of people, vehicles or wild animals into the roadway or train tracks. They are equipped with means to direct flow of rain water away from the roadway to improve transportation safety. They can be configured to enable harvesting of rainwater by utilizing the spaces under photovoltaic structures or they can be configured to direct rainwater in water storage tanks, or dispose rain water in a predetermined direction. Hence the energy generation systems 100, 100', 1700b offer a multi-pronged approach for transportation safety, clean energy generation and storm water management.

The infrastructure energy generation system 100, 100' (FIGS. 1, 20a, 20b, 20c, 21a, 21b, 22a, 22b, 22c, 23a, 23b, 23c) is comprised of one or more photovoltaic structures (10') installed along a transportation route for generating electricity from solar energy while providing vehicular and transportation safety. It is comprised of one or more photovoltaic structures (10') installed substantially parallel to a transportation route in a substantially continuous manner. Each of the photovoltaic structures are comprised of two parallel traffic barriers (2,3) supporting plurality of solar panels (11') which are supported by structural frames (12) in a predetermined configuration facing the sky for maximizing solar exposure. For example FIGS. 1, 20a, 20b show solar panels (11') sloping towards longitudinal axis of the road while FIG. 21a shows solar panels (11') sloping perpendicular to the longitudinal axis. FIG. 21b shows solar panels (11') forming valleys and ridges perpendicular to the longitudinal axis of the road while FIGS. 22a, 22b show solar panels (11') forming valleys and ridges parallel to the longitudinal axis. The aforementioned embodiments enable to maximize solar exposure for solar panels (11') depending upon the direction of the transportation route. Structural frames (12) are configured accordingly to support solar panels (11'). To enable ventilation for solar panels (11') predetermined perforations can be used (not shown) within traffic barriers (2,3). Predetermined gaps can also be maintained at the ridges and/or valleys of solar panels (11) for allowing heat produced by solar panels to escape. Solar panels 11' are preferably butted against each other to facilitate drainage of rainwater in a predetermined direction.

As shown in FIGS. 1, 20a, 20b, 20c, 21a, 21b, 22a, 22b, 22c, 23a, 23b, 23c, photovoltaic structures (10') are configured to utilize median and/or shoulders of a road. These structures can also be installed in the CESS area along train tracks, along a linear boundary or used as area dividers. Photovoltaic structures (10') are configured to minimize damage to vehicles along transportation routes in the event of an accidental impact on traffic barriers. This is achieved by the predetermined size, shape and structural strength of the traffic barriers. Photovoltaic structures (10') are configured to minimize damage to solar panels (11') in the event of an accidental impact on the traffic barriers. This is achieved by providing structural isolation joints (16a) between traffic barriers (2,3) and structural frames (12). Photovoltaic structures (10') are configured to prevent intrusion of people, vehicles or animals into the transportation route for providing vehicular and transportation safety. This is achieved by installing photovoltaic structures 10' in a substantially continuous manner. Photovoltaic structures (10') are configured to facilitate drainage of rain water away from transportation route in a predetermined direction to facilitate transportation safety, storm water management, and drainage water management along the transportation route. This is achieved by providing rain water gutters (15a) and drains (15b). The utilization of solar panels for facilitating storm water management and drainage water management is novel as it provides added environmental benefits. The rainwater collected from solar panels can be directed to water storage tanks which can also be located under photovoltaic structures (10'). Photovoltaic structures (10') are configured to conceal electrical switchgear and/or electrical transmission lines within the photovoltaic structures for weather protection, for public safety as well as to prevent vandalism. This is achieved by the enclosure formed by traffic barriers (2,3) and solar panels (11'). The electricity produced by solar panels (11') is be transmitted via an off-grid electrical system, a Distributed Energy Resource (DER), a microgrid or a grid-tied electrical system. Photovoltaic structures (10') can be equipped with lights (L1, L2) as shown in FIGS. 17a, 17b to utilize electricity produced by solar panels (11'). This can be achieved by providing an electrical storage battery within photovoltaic structure 10'. Photovoltaic structures (10') can be configured to supply electricity to vehicle charging stations by using an off-grid electrical system, a Distributed Energy Resource (DER), a microgrid or a grid-tied electrical system. Photovoltaic structures (10') can be configured to supply electricity directly to electrical vehicles along the transportation route by using an off-grid electrical system, a Distributed Energy Resource (DER), a microgrid or a grid-tied electrical system. The utilization of electricity for transportation which is produced by the using spaces along the same transportation routes is novel as it saves on land costs for the solar installation, it saves on installation costs on long distance transmission lines, and it cuts down on electrical transmission losses that may occur on long distance transmission lines. The electricity is produced where it is needed, and the installation pays for itself.

FIG. 17b discloses infrastructure energy generation system 1700b comprising plurality of photovoltaic structures (10') installed along a transportation route for generating electricity from solar energy while providing vehicular and transportation safety. Photovoltaic structures (10') form a linear arrangement parallel to a transportation route in a substantially continuous manner; other arrangements are within the scope of the present invention. For example photovoltaic structures (10') can be arranged in a curvilinear arrangement along the curves of a road. They can also be arranged in other configurations similar to as shown in FIGS. 17a and 25. As shown in FIG. 17b the photovoltaic structures (10') are comprised of a structurally stable hollow structural base (173) supporting plurality of solar panels (11') on top in a predetermined configuration for maximizing solar exposure for the solar panels. FIG. 17b shows a ridge formed at the top by solar panels (11'); other configurations of solar panels (11') such as flat top or a sloped top is also within the scope of the present invention. This enables to maximize solar exposure for solar panels depending upon the direction of the transportation route. The sides of hollow structural base facing the road have a predetermined profile and structural strength to act as a vehicle impact barrier, traffic barrier, roadside barrier or work zone barrier. Many such profiles such as jersey barriers are known in the art, and are often recommended by the transportation authorities. The sides of structural base are intended be similar to traffic barriers (2,3) as disclosed herein before. This enables to minimize damage to vehicles along the transportation in the event of an accidental impact on the hollow structural base. Solar panels (11') are preferably attached to hollow structural base (173) with structural isolation joints such as rubberized isolators to minimize damage to solar panels in the event of an accidental impact on the hollow structural base. The arrangement of photovoltaic structures (10') in a substantially continuous manner enables to prevent crossing of people, vehicles or animals into the transportation route for transportation safety. Photovoltaic structures (10') are configured to facilitate drainage of rain water away from the transportation route in a predetermined direction to facilitate transportation safety as well as storm water management, and drainage water management along the transportation route. This can be achieved by providing rain water gutters (15a) and drainage pipes (15b) similar to as shown in FIGS. 22b, 22c. Photovoltaic structures (10') are configured to conceal electrical switchgear and/or electrical transmission lines within the photovoltaic structures for preventing vandalism, for weather protection and for public safety. Photovoltaic structures (10') are configured to produce electricity from solar energy and supply the electricity to an off-grid electrical system, a Distributed Energy Resource (DER), a microgrid or a grid-tied electrical system. The electricity produced is intended to be used for powering vehicle charging stations along the transportation route. The electricity produced can also be used to directly power electrical vehicles along the transportation route as shown in different embodiments of the present invention. Photovoltaic structures (10') are preferably modular units which can be readily assembled in the field. They can also be portable units that can assembled and disassembled as required, for example, during construction. They can be used as area dividers to divide properties or transportation routes. Photovoltaic structures (10') can be equipped with lights L1 similar to as shown in FIG. 17a. The lights can be configured to utilize electricity produced by solar panels by using an electrical battery concealed within the photovoltaic structures. The photovoltaic structures (10') don't need to be fully enclosed on all sides as shown in FIG. 17b; they can be enclosed only on two sides parallel to the road by using traffic barriers (2,3). This is particularly useful when photovoltaic structures (10') are attached to each other in a continuous manner. Although FIG. 17b shows photovoltaic structures 10' spaced by a predetermined distance, installing them butting against each other in a continuous manner to form a long traffic barrier similar to as shown in FIGS. 1, 20b, 22b is within the scope of the present invention.

The term 'traffic barrier' in the context of the present invention generally represents a barrier wall having a predetermined size, shape and structural strength intended for vehicular safety. Different governmental agencies have different requirements for sizes, shapes and structural strength for traffic barriers. The terms 'vehicle impact barriers' and 'traffic barriers' are used interchangeably in the context of the present invention. These barriers can be used as roadside barriers, work zone barriers, area dividers and the like; all such utilities are within the scope of the present invention. Traffic barriers 2, 3 can be made of concrete, hollow plastic, a rigid material, or a combination of rigid materials. Traffic barriers (or vehicle impact barriers) denoted as 2, 3 in different FIGS. are meant to represent similar or alike elements regardless of their size, shape, material or location. For example the size and shape of traffic barriers designated by 2,3 in FIGS. 1 and 20b are different than those shown in FIGS. 22b and 23b but they are meant to represent traffic barriers or vehicle impact barriers in general. In this context designations 2, 3 are same or similar to as if they were denoted as 2',3'. Similarly designation 12 for structural frames is used in a generic sense regardless of their shape, size and location; it is intended to represent 12' although it is not denoted as such. FIGS. 1, 21a, 21b show traffic barriers 2,3 as continuous, but they are intended to be of modular units, say for example, from 5 feet to 50 feet long which are then structurally connected or interlocked together in a linear arrangement. They can also be configured to align with the curves of the transportation routes as required. Traffic barriers 2,3 can be secured to ground or they can be made of a heavy material to make them self supporting. Only one of the traffic barriers 2,3 facing the road need to meet the vehicle safety requirements, the other can be just a vertical structural support.

The invention claimed is:

1. An infrastructure energy generation system for placement along a transportation route to produce electricity and enable traffic safety along the transportation route, comprising:
   one or more solar arrays supported by a plurality of traffic barriers by using structural isolation joints;
   said solar array(s) being comprised of a plurality of solar panels supported by a plurality of structural frames;
   said structural isolation joints being installed between said traffic barriers and said structural frames;
   wherein said solar panels are configured to generate electricity from solar energy and supply said electricity to an off-grid electrical system, a grid-tied electrical system, a Distributed Energy Resource (DER) or a microgrid.

2. The infrastructure energy generation system of claim 1 wherein said traffic barriers are sized and shaped to comply with the traffic safety requirements of at least one governmental agency having jurisdiction over said transportation route.

3. The infrastructure energy generation system of claim 1 wherein said traffic barriers comprise lights powered by said off-grid electrical system, said grid-tied electrical system, said Distributed Energy Resource (DER) or said microgrid.

4. The infrastructure energy generation system of claim 1 wherein said traffic barriers and said solar panels form an enclosure.

5. The infrastructure energy generation system of claim 1 wherein said solar arrays are oriented substantially horizontally between two rows of said traffic barriers (FIGS. 23a, 23b).

6. The infrastructure energy generation system of claim 1 wherein said solar arrays are tilted to form one or more ridges and valleys between two rows of said traffic barriers (FIGS. 21b, 22a, 22b).

7. The infrastructure energy generation system of claim 1 wherein one or more rainwater gutters are attached to said traffic barriers configured to discharge rainwater from said solar panels in a predetermined direction.

8. The infrastructure energy generation system of claim 1 wherein said solar arrays are tilted at one or more predetermined angles between two rows of said traffic barriers for maximizing solar exposure (FIGS. 1, 20a, 20b, 21a).

9. An infrastructure energy generation system, comprising:
   a hollow structural base supporting one or more solar arrays by using structural isolation joints;
   said hollow structural base being enclosed by a plurality of walls;
   at least one of said walls being shaped and sized as a traffic barrier;

said solar array(s) being comprised of a plurality of solar panels supported by a plurality of structural frames;

said structural frames being structurally connected to said walls by using said structural isolation joints;

wherein said infrastructure energy generation system is configured to generate electricity from solar energy and supply said electricity to an off-grid electrical system, a grid-tied electrical system, a Distributed Energy Resource (DER) or a microgrid.

10. The infrastructure energy generation system of claim 9 wherein said hollow structural base comprise lights powered by said off-grid electrical system, said grid-tied electrical system, said Distributed Energy Resource (DER) or said microgrid.

11. The infrastructure energy generation system of claim 9 wherein said hollow structural base is substantially enclosed from all sides.

12. The infrastructure energy generation system of claim 9 wherein said solar arrays are tilted to form one or more ridges and valleys between said hollow structural base.

13. The infrastructure energy generation system of claim 9 wherein said solar arrays are sloped at a predetermined angle between said hollow structural base.

14. The infrastructure energy generation system of claim 9 wherein said hollow structural base comprise least one rainwater gutter configured to discharge rainwater from said solar panels in a predetermined direction.

15. The infrastructure energy generation system of claim 9 wherein said hollow structural base is comprised of two opposing said side walls sized and shaped as traffic barriers (FIG. 17b).

16. The infrastructure energy generation system of claim 9 wherein said solar panels are oriented to form a ridge in the middle of said hollow structural base (FIG. 17b).

17. An infrastructure energy generation system, comprising:

one or more solar array(s) supported by two rows of traffic barriers with structural isolation joints;

said solar array(s) being comprised of a plurality of solar panels supported by a plurality of structural frames;

said structural frames being structurally connected to said traffic barriers with said structural isolation joints;

wherein said solar panels are configured to generate electricity from solar energy and supply said electricity to an off-grid electrical system, a grid-tied electrical system, a Distributed Energy Resource (DER) or a microgrid.

18. The infrastructure energy generation system of claim 17 wherein said solar arrays are oriented to face one or more sunward direction(s) (FIGS. FIGS. 1, 20a, 20b, 20c, 21a, 21b, 22a, 22b, 22c, 23a, 23b).

19. An infrastructure energy generation system, comprising:

a plurality of solar arrays facing one or more sunward direction(s) supported by at least one row of traffic barriers by means of structural isolation;

said solar arrays being comprised of a plurality of solar panels supported by a plurality of structural frames;

said solar arrays being protected from damage against vehicular impacts on said traffic barriers by said means of structural isolation;

wherein said solar panels are configured to generate electricity from solar energy and supply said electricity to an off-grid electrical system, a grid-tied electrical system, a Distributed Energy Resource (DER) or a microgrid.

* * * * *